United States Patent
Warren

(10) Patent No.: US 8,204,159 B2
(45) Date of Patent: Jun. 19, 2012

(54) CALIBRATED PULSED SERIAL LINK

(75) Inventor: Robert Warren, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 746 days.

(21) Appl. No.: 12/094,778

(22) PCT Filed: Nov. 25, 2006

(86) PCT No.: PCT/GB2006/004405
§ 371 (c)(1), (2), (4) Date: Jan. 15, 2009

(87) PCT Pub. No.: WO2007/060454
PCT Pub. Date: May 31, 2007

(65) Prior Publication Data
US 2009/0220028 A1 Sep. 3, 2009

(30) Foreign Application Priority Data
Nov. 24, 2005 (GB) .................................. 0523939.7

(51) Int. Cl.
*H04L 27/06* (2006.01)

(52) U.S. Cl. ........ 375/340; 375/355; 375/356; 375/360; 375/373; 375/375; 375/376

(58) Field of Classification Search .................. 375/340, 375/355, 356, 360, 373, 375, 376
See application file for complete search history.

(56) References Cited

U.S. PATENT DOCUMENTS

| | | | |
|---|---|---|---|
| 4,327,441 A | 4/1982 | Bradshaw | |
| 5,436,853 A | 7/1995 | Shimohara | |
| 5,459,751 A | 10/1995 | Okamoto | |
| 6,020,834 A | 2/2000 | Rider | |
| 6,044,333 A | 3/2000 | Stobbe et al. | |
| 6,463,092 B1 | 10/2002 | Kim et al. | |
| 2003/0027542 A1 | 2/2003 | Hediger et al. | |
| 2005/0077976 A1 | 4/2005 | Cohen et al. | |
| 2005/0286643 A1* | 12/2005 | Ozawa et al. | 375/242 |

OTHER PUBLICATIONS

International Search Report from corresponding International Application No. PCT/GB2006/00405, filed May 31, 2007, International Search Report completed Mar. 1, 2007.
Standard Search Report from a corresponding Britishh Application No. GB0523939, filed Nov. 24, 2005, Standard Search Report completed Apr. 21, 2006.

* cited by examiner

*Primary Examiner* — Kabir A Timory
(74) *Attorney, Agent, or Firm* — Wolf, Greenfield & Sacks, P.C.

(57) ABSTRACT

Circuitry for decoding data from a pulsed signal received on a single line, the circuitry comprising receiving means for receiving a first edge and a second edge on the single line, the first and second edges being separated by a time period, the time period representing said data; decode circuitry comprising determining means arranged to determine a value of the time period and decoding means arranged to decode said data based on said determined value of the time period; a memory arranged to store a reference value; and calibration means for calibrating said decode circuitry based on a comparison between said determined value of the time period and said reference value, wherein the determining means comprises a plurality of sampling units for sampling said pulsed signal at different times, and selection means for selecting the output of one of said sampling units to decoded.

41 Claims, 13 Drawing Sheets

CALIBRATED PULSED SERIAL LINK

TECHNICAL FIELD

The present invention relates to the calibration of a serial link, and in particular to the calibration of decode circuitry.

BACKGROUND

Modern integrated circuits (ICs) use timing signals to control sequences of events across a chip, and this is known as synchronous design. A clock signal is sent to each module on a chip, and data signals are sent on separate lines. If a first module sends data to a second module following a clock transition $T_n$, then the second module will capture the data at the next clock transition, $T_{n+1}$. Use of synchronous design is a crucial factor in constraining the complexity of problems in integrated circuit design.

A typical system on a chip (SoC) may have a large number of clocks. All of the logic in all of the modules clocked by a single clock, and all of the logic and data connections between such modules is known as a single clock environment and this conforms to synchronous design. Other design techniques are employed for data signals that cross between logic or modules that are clocked by different clocks.

Whilst synchronous design between modules generally limits IC design problems there are problems with this approach. Firstly, for a synchronous chip to function correctly, a reliable clock signal has to be available across every part of the design. Tracks are generally used to transport the clock signal on a chip. High drive strengths will be required in order to overcome capacitance on these tracks. Lines with high drive strengths risk being cross-talk aggressors, meaning that they interfere with other lines on the chip. The solution is generally to limit the maximum length of any one track, and use repeaters where the track length is longer than this maximum length. However, in order to distribute the clock, there may well not be one long thin track, but a tree branch fan-out to a number of destinations. Driving a lot of circuit track has a number of undesirable effects including inducing cross-talk and transistor lifetime degradation. Furthermore, there are often design problems in driving many buffers to all destinations on a chip.

The problems with synchronous designs may be partially overcome in asynchronous designs, in which modules on a chip may operate at their own independent speeds, and no clock signal is transmitted between modules. However, an entirely asynchronous design is an extremely difficult proposition in practice, due to the uncertainty of when signals in the circuit are valid.

An approach has been proposed which is globally asynchronous, locally synchronous (GALS). This means that the logic in each module on a chip is synchronous, however, the connections between modules are asynchronous. This approach promises to solve timing problems and reduce power consumption, all without designers needing to learn fundamentally new skills or abandoning any of the existing huge investment in predefined, synchronous IP (Intellectual Property) circuit blocks. However, for asynchronous communication between modules on a chip, there are two basic requirements: the receiving unit has to know when to read the data line; and the sending unit has to know when it can send a new value. In synchronous designs these issues are controlled by the system clock, and by knowing the timing characteristics of the link, timing can be controlled such that these requirements are met.

Asynchronous design is significantly more difficult both for manual analysis and to automate because of the computational complexity. In synchronous design, it is only the final, settled output of each logic cone that needs to be analysed in terms of its logic value and timing; that is, what is the longest path that a transition could take to propagate through the logic cone and also what is the shortest path (used to determine how long the result will remain stable after a subsequent clock). This synchronous design analysis only need be performed at two process extremes, the slowest PVT (process, voltage, temperature) for the longest path and the fastest PVT for the shortest path. In synchronous design, it does not matter if the output of any cone of logic changes any number of times or glitches prior to the final settled output time because the resultant data is only captured once coincident with the following clock edge. However, in asynchronous design multiple output changes and glitches need to be avoided and the analysis for such needs to be performed across all variations of input timings and all combinations of timing paths through the logic cone.

Another inherent problem with asynchronous design is the philosophical issue of decision making. At certain points in time, decisions need to be made, such as whether a change in signal A occurred before or after a change in signal B. If the timing of the change in A is close to the timing of the change in B then there is an increased risk of vacillation or dithering (referred to as metastability). In order to ensure correct operation, a large delay (for example tens of times longer than a gate delay), needs to be inserted to reduce the risk to an acceptable level. This same issue occurs for signals crossing between clock environments of synchronous designs and is handled by the insertion of synchronisers incurring a similar delay.

In asynchronous design, with no clock, a different approach must be used. The simplest of these approaches is to use two wires—one for '1's and the other for '0's. When both wires are low, then no data is transmitted and the receiver knows that there is no data value on the wire. When either wire is set to high, the receiver knows that there is data on the wire, and depending on which wire is set to high, the data will be a 0 or a 1.

Another approach is to have one wire designated as a clock or strobe, and the second wire (or collection of wires) carrying the data.

With both of these approaches, the design must be such that changes in either of the two wires are separated in time, or a delay must be inserted to reduce the effects of metastability.

GB Application No. 0428422.0 (PCT/GB2005/004889) describes a pulsed serial link that at least partially addresses the problems in the prior art described above. It is an aim of embodiments of the present invention to also at least partially address some of these above problems known in the prior art, and also to address other issues.

SUMMARY

According to a first aspect of the present invention, there is provided circuitry for decoding data from a pulsed signal received on a single line, the circuitry comprising receiving means for receiving a first edge and a second edge on the single line, the first and second edges being separated by a time period, the time period representing said data; decode circuitry comprising determining means arranged to determine a value of the time period and decoding means arranged to decode said data based on said determined value of the time period; a memory arranged to store a reference value; and calibration means for calibrating the decode circuitry based on a comparison between the determined value of the time period and the reference value.

The data can comprise one of a first digital value represented by a first time period and a second digital value represented by a second time period.

According to one embodiment the reference value is the expected value of the time period.

According to one embodiment the pulsed signal is a calibration pulse wherein the time period of the pulse represents a predetermined digital value known to said calibration circuitry.

The determining means preferably comprises a plurality of sampling units for sampling said pulsed signal at different times. The decode circuitry preferably comprises selection means for selecting the output of one of said sampling units to be decoded.

According to another embodiment, the reference value is the value associated with the sampling unit the signal from which is to be decoded.

The means for calibrating decode circuitry can comprise means for controlling the selection by the selection means in the decode circuitry.

The circuitry preferably comprises a plurality of delay lines for controlling the sampling time of respective sampling units, the plurality of delay lines connected in The circuitry preferably comprises a plurality of delay lines for controlling the sampling time of respective sampling units, the plurality of delay lines connected in series. The calibration means can comprise means for controlling at least one of said delay lines.

According to one embodiment the delay lines comprises fine tune circuitry.

Counter circuitry is preferably arranged to receive the pulsed signal and provide an indication to said calibration circuitry when said pulsed signal comprises a calibration pulse.

In the preferred embodiment, the determination means includes a computation block arranged to determine which of the outputs of the sampling units are to be used as higher and lower cut-off points for decoding said data. The computation block is arranged to generate a multi-bit control value identifying said outputs for controlling the selection means.

In one aspect of the invention the pulsed signal conveys clock information on each first edge. The clock information can be used to clock the selection means and/or the determination means.

According to another aspect of the present invention, there is provided a method for decoding data from a pulsed signal received on a single line, the method comprising the steps of receiving a first edge and a second edge on the single line, the first and second edges being separated by a time period, the time period representing said data; determining a value of the time period; calibrating decode circuitry based on a comparison between the determined value of the first time period and a reference value stored in a memory; and decoding the data based on the determined value of the first time period.

According to one embodiment the data comprises one of a first digital value represented by a first time period and a second digital value represented by a second time period.

Preferably, the step of decoding said data comprises the step of selecting one of said sampled pulsed signals to be decoded.

Preferably, the step of calibrating said decode circuitry comprises the step of controlling the selection by the selection means in the decode circuitry.

According to one embodiment the reference value is the value associated with said one of said sampling units selected to be decoded.

Preferably a plurality of delay lines is provided for controlling the sampling time of respective sampling units.

The step of calibrating the decode circuitry can comprise the step of controlling the delay of at least one of the delay lines.

Calibrating the decode circuitry can be performed based on the determined time period of a pulsed signal carrying data, rather than a dedicated calibration pulse. Alternatively or additionally, calibration can be performed based on the determined time period of a calibration pulse. The intended width of a calibration pulse is known by the calibration circuitry, and therefore this information can be used to calibrate the decode circuitry.

BRIEF DESCRIPTION OF THE DRAWINGS

For a better understanding of the present invention and to show how the same may be carried into effect, embodiments of the invention will now be described by way of example with reference to the accompanying drawings, in which.

DETAILED DESCRIPTION

Figure 1:
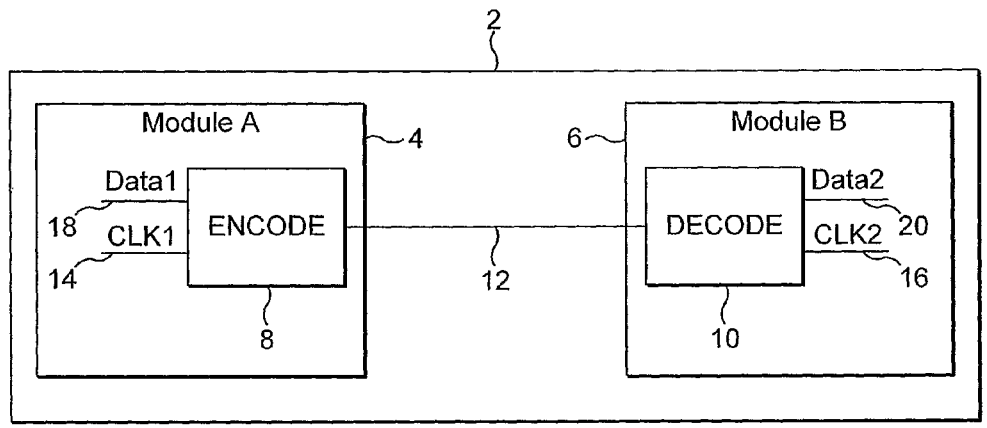
FIG. 1 shows circuitry for communication between two modules on an integrated circuit in which embodiments of the present invention can be incorporated.

FIG. 1 shows circuitry in which data is to be transmitted between a module A, labelled 4 in FIG. 1 and module B, labelled 6 in FIG. 1, both modules being on an integrated circuit 2. Although modules A and module B are illustrated as being on the same chip, it will readily be appreciated that the principles discussed in the following can be implemented in a number of different environments, in particular in a situation where the communicating modules are on different ICs. In prior art embodiments, a parallel bus with separate clock distributed to both modules may have been used between modules A and B in order to transmit data and time information. In such systems the clock frequency must be low enough to allow clean synchronous communication across the plurality signal wires comprising the parallel bus. In order to increase the bandwidth (number of bits of useful communication per second) of the system, the number of wires is increased. Alternatively, in typical asynchronous communications, for example in the RS232 serial port, a single wire carries the bit information which is clocked at a specified clock rate. The two clocks, one in the transmitter, and one in the receiver, are independent and asynchronous in both phase and frequency, but are both within the specified tolerance range. This asynchronous arrangement is typically further refined by continuously adjusting, adapting or locking the receive clock to closely match the characteristics of the transmit clock by inference from the edges in the received data. Nonetheless, the two clocks are independent and hence described as asynchronous.

Serial communications links have a number of problems. They have relatively high latency due to resynchronisation requirements at the destination module. Bandwidth is limited due to the tolerance range specified above. In alternative serial connects where a clock is transmitted alongside data, bandwidth will also be limited by tolerances imposed because of timing variations between the signals. Serial links are also costly due the requirement of generating the necessary high speed encoding and sampling clocks. Encode and decode blocks for serial links also require complex logic, especially if analogue techniques are employed.

According to the embodiments such as the embodiment shown in FIG. 1, a single wire 12 is used between modules A and B to transmit data and timing information. In order to achieve this, a data signal DATA1 on line 18 is encoded by an encode block 8 with a clock signal CLK1 received on line 14 before being transmitted on line 12. A decode block 10 decodes the signal on line 12, to retrieve the data signal, now labelled DATA2 on line 20, and the clock signal CLK2 on line 16. According to this embodiment, CLK1 will have the same frequency as CLK2, however the phase relationship between these clocks is indeterminate.

The system of FIG. 1 can be described as GALS (globally asynchronous, locally synchronous) as will now be explained. Module A includes logic (not shown) clocked by CLK1 which generates the data signal DATA1 on line 18, and module B includes logic clocked by CLK2 which receives the data signal DATA2 on line 20. The logic in Modules A and B is synchronous in that it is clocked by CLK1 and CLK2 respectively. However, as CLK1 is not in phase with CLK2, modules A and B can be said to be asynchronous. Therefore, globally the circuit is asynchronous.

A system for encoding data and timing information onto a single connection 12 will now be described with reference to FIGS. 2 to 5. The underlying principle of the system will be described first with reference to FIG. 2A.

Figure 2A:
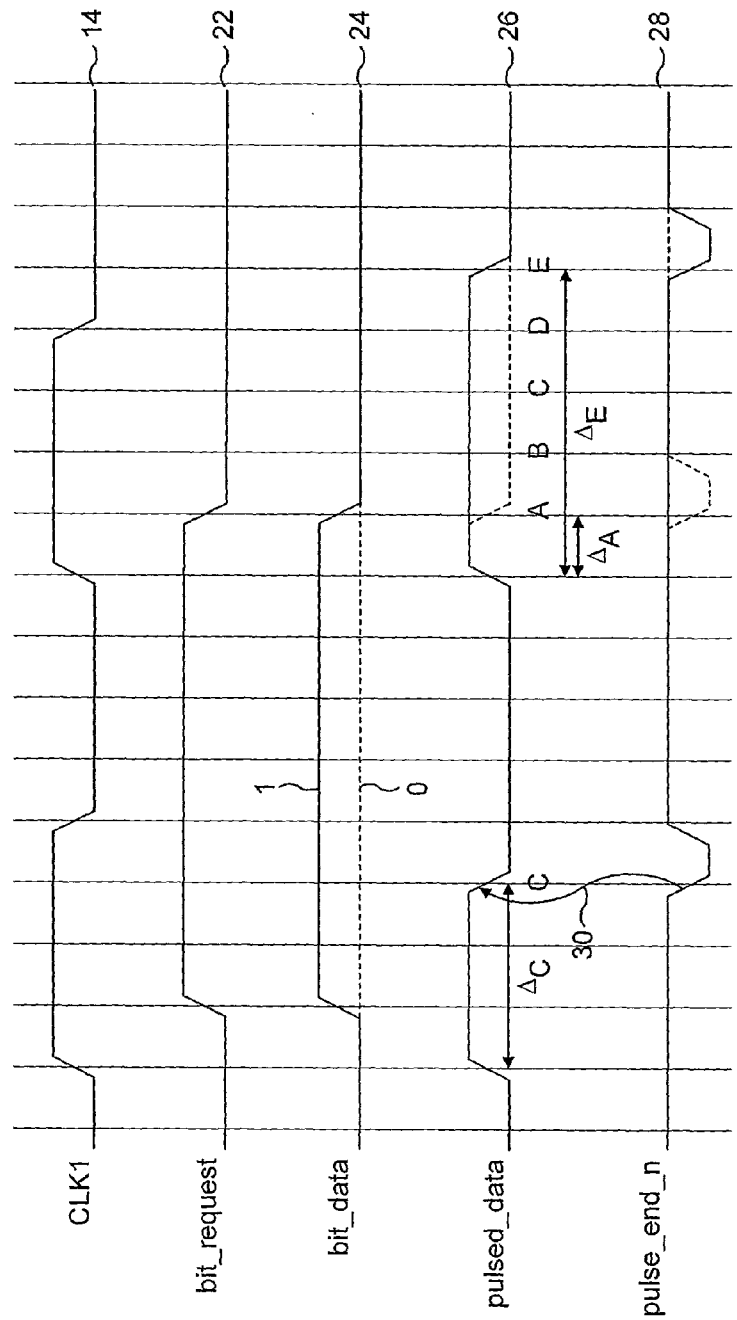
FIG. 2A shows data and timing signals encoded according to one example of a pulsed serial link according to one embodiment.

FIG. 2A shows timing diagrams for clock signal CLK1 14, a bit_request signal 22, bit_data signal 24, a pulsed_data signal 26, and a pulse_end_n signal 28. The frequency of this clock signal is, for example 100 MHz, however clock frequencies used in other embodiments could be any clock frequency that would work given the particular environment.

Bit_request signal 22 is a common signal used in conjunction with data signals, and when this signal is high, this indicates that the data on bit_data signal 24 is valid.

The bit_data signal 24 indicates the data value whilst bit_request signal 22 is high. The bit_data value transmitted by bit_data signal 24 could be a '1' or '0', represented by a high or low signal: both possibilities are shown in FIG. 2A.

According to embodiments described herein, the clock signal CLK1, bit_request and bit_data signals are all encoded into a single signal. This is shown as pulsed_data signal 26. The rising edges of pulsed_data signal 26 occur immediately following rising edges of clock signal CLK1. Therefore, the pulsed_data signal 26 is still valid as a clock signal for any sequential logic clocked by the rising edge of said pulsed_data signal. When this signal is received by module B, the clock signal may be used not only for allowing the retrieval of the encoded data (discussed later), but also for use as a local clock, after suitable buffering, in module B. The buffering delays the clock to produce CLK2 used by the logic in module B and, thus CLK2 must be treated as a separate clock from that used directly for decoding.

As shown by the example illustration of signal 26, data is encoded into the falling edge of the clock signal which can be transmitted on a single wire (line 12 in FIG. 1). This is achieved by altering the timing of the falling edge depending on the data. In the case that at the time of the first rising edge of CLK1 14, the bit_request was low, this indicates there is no valid data to send. This is indicated by the first falling edge of the pulsed_data signal 26 falling at point C, a predetermined delay $\Delta_C$ from the rising edge.

At the second rising edge of CLK1 14, bit_request signal 22 is high, indicating that there is data on bit_data signal 24. In this case, if the data is a '0', the falling edge will be at time A, a delay $\Delta_A$ from the rising edge, and if the data bit is a '1', the falling edge will be at time E, a delay $\Delta_E$ from the rising edge. In this way data is encoded onto the clock signal. In this embodiment, timing locations B and D (at respective delays $\Delta_B$, $\Delta_D$ from the rising edge) are used when decoding the encoded signal, as will be explained in more detail below.

In this example, the request and one bit of data has been encoded onto three possible positions of the falling edge of the clock signal. Thus effectively 3 input bits (clock, request and one bit of data) have been encoded onto a single wire with only 3 variations per period where normal binary logic would require 8 variations for 3 bits. However, the clock does not represent a full binary bit because it is only the rising edge that is of interest. Also, the combination of request and data does not represent two full binary bits because the data is irrelevant when there is no request. In alternative arrangements a single wire with only two or any number more than three possible positions of the falling edge of the clock signal could be used. Such alternative arrangements could be used to encode one, two, three, four or more data bits into each falling edge. Also, as described in more detail below, one or more control functions could be encoded into each falling edge. This would require more, or less, possible timing locations for the falling edge. For example, consider the pulse shown in FIG. 2B, where failing edge location A denotes 00, falling edge location B denotes 01, falling edge location C denotes a null, falling edge location D denotes 10 and falling edge location E denotes 11. It will be apparent when the encoding and decoding circuitry is described below that slight modification to this circuitry would allow a greater number of bits to be transmitted on each falling clock edge. The only limiting factor in the amount of information that can be transmitted is the accuracy of the delay circuitry delaying the falling edges, and the accuracy of the detecting circuitry for detecting the timing of the falling edges in the decode block. However, it is important to note that absolute accuracy of delay elements in encode and decode circuits is not important, only their accuracy in respect to each other.

Finally, the pulse_end_n signal 28 shown in FIG. 2A is a signal that occurs in the encode circuit during the encoding of the data and clock, and this signal will be referred to in relation to the operation of the encoding block.

There are numerous advantages with pulsed serial link described above. This is a genuine single wire connection, with clock, data and data valid encoded on one line. As described below, the encode and decode blocks can be purely digital. Bandwidth is used efficiently. High speed clocks are not required, and nor are analogue techniques. There is also no requirement for an isolated power supply. The logic required for encoding and decoding is minimal, and for higher bandwidth utilisation, the amount of logic scales proportionately. Furthermore, if the clock is stopped during periods when no data is being transferred, the link is power efficient. In the circuit of FIG. 1, when CLK1 is stopped, CLK2 is also stopped and hence all of the logic in module B no longer consumes power.

Figure 3:
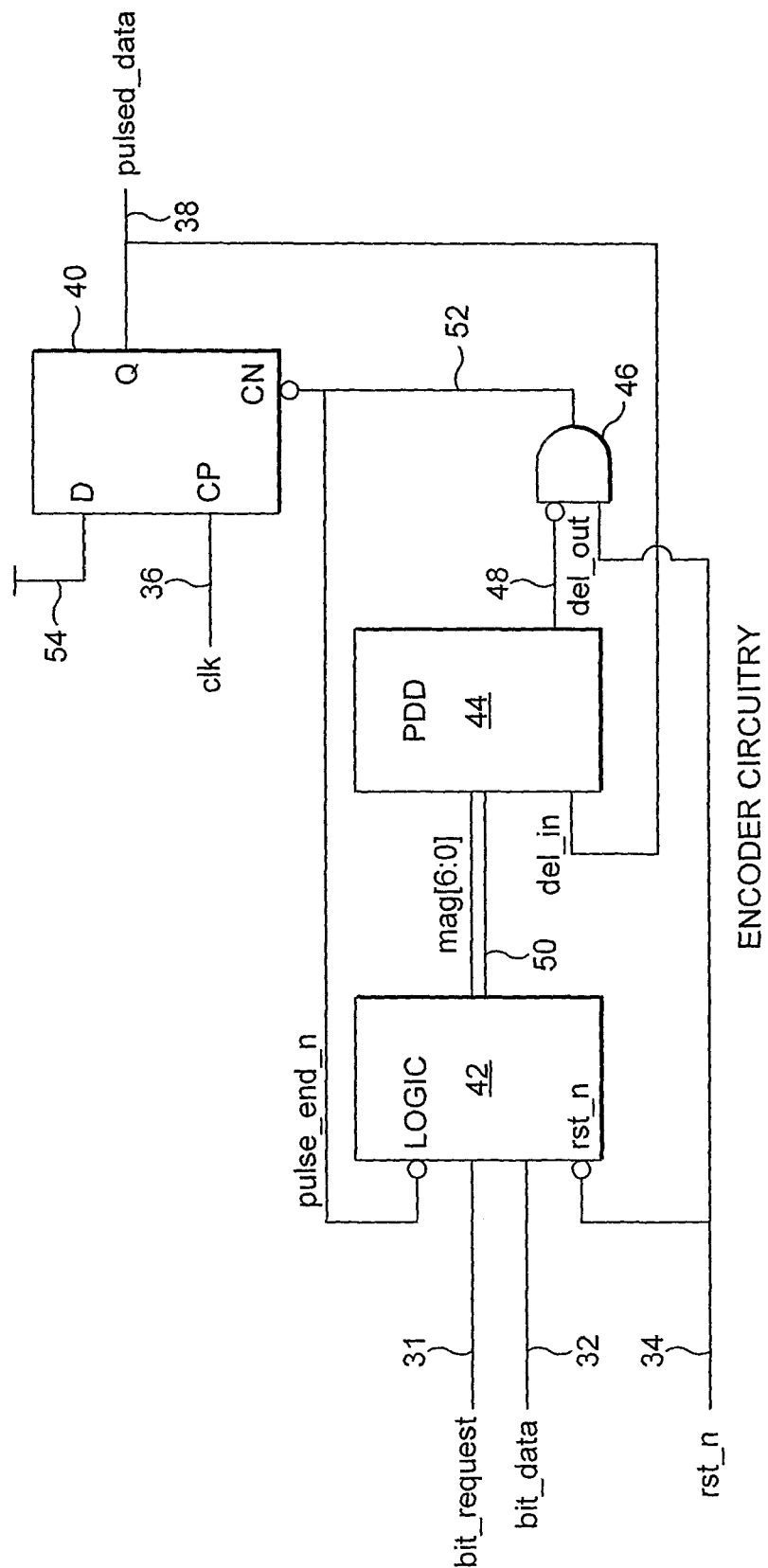
FIG. 3 shows encoding circuitry for encoding data in a pulsed serial link according to another embodiment.

FIG. 3 shows encode circuitry according to one embodiment. As shown in FIG. 3, the bit_request signal is provided on line 31, the bit_data signal is provided on line 32, the clock signal is provided on line 36, and a reset signal, rst_n, is provided on line 34. During normal operation of the encoder circuitry, the reset signal, rst_n, on line 34 will be high, allowing the circuit to function normally. The reset signal, rst_n, is asserted low during power up and in other situations to ensure a clean initial state across the system on chip (SoC). However, in alternative embodiments other initialisation techniques could be used which do not require this form of reset signal.

The encoder circuitry comprises a D-type flip-flop 40, logic block 42, a programmable digital delay (PDD) block 44, and AND gate 46. The pulsed_data output signal 26 is provided at the output of flip-flop 40 on line 38. The signals bit_request and bit_data on lines 31 and 32 are connected to inputs of the logic block 42. The reset signal, rst_n, on line 34 and a pulse_end_n signal 52 from the output of the AND gate 46 are also connected to inputs of the logic block 42. Based on the values of bit_request and bit_data, and also the values of the rst_n signal and the pulse_end_n signal, the output of logic block 42 labelled 50 is determined.

In the present embodiment, the output of logic block 42 will be a series of control lines 50, in the form similar to a one hot encoding, which control circuitry in the PDD block 44. One hot encoding is a scheme known to those skilled in the art that allows the complexity of system design to be minimised. There are seven control lines in the embodiment shown in FIG. 3, labelled Mag(0) to Mag(6), and on each line a '0' or a '1' may be asserted, with the only legal combinations being all 0's or a continuous run of 1's across any number of Mag(0), Mag(1) through to Mag(6) respectively. For example, if Mag(4) is asserted, then lines Mag(3) to Mag(0) must also be asserted. This is a requirement of the PDD 44 described in the current embodiment, and if alternative programmable delay lines were used, then different combinations of signal might be possible.

The number of these control lines that are asserted high determines the magnitude of the delay Δ of the programmable digital delay block 44 between its input signal, del_in connected to 38 and its output signal, del_out, connected to 48. Seven control lines are provided is this embodiment, which allow reset plus seven different delay values to be selected. The first such selection, when all control lines 50 are zero, is used when in the defined initial condition for the circuit, which is when rst_n is asserted low. The second such selection, when only mag(0) is '1', is the minimum delay, used to control the width of the low going pulse of pulse_end_n on line 52, as explained in more detail below. Five of the remaining different delay values allow the five delays $\Delta_A$ to $\Delta_E$ to be selected.

The programmable digital delay block 44, which is connected to logic block 42 by connection 50, receives the magnitude control signals Mag(0) to Mag(6), and also receives the pulsed_data signal on line 38 from the flip-flop 40. The PDD 44 determines the timing of the falling edge of the pulsed_data signal on line 38. The inverted output of PDD 44 on line 48 is connected to one input of two input AND gate 46. The second input of AND gate 46 is connected to the reset signal rst_n 34. The output of AND gate 46 on line 52 is connected to a not reset input CN of D-flip flop 40, which causes an asynchronous reset of the flip-flop when line 52 is low, independent of the clock input CP 36. This output on line 52 is also connected to logic block 42.

In alternative embodiments, the magnitude of the delay through the PDD 44 may be controlled by any encoding scheme which is different from the one-hot encoding scheme described above, such as straight binary, gray-code, mixed course plus fine, or any encoding to suit the range and selection of the programmable delays required.

Logic block 42 will output low signals on all of the control lines if the reset signal on line 34 is low, irrespective of values on other inputs.

If rst_n is high, and the pulse_end_n signal on line 52 is low, then according to the present embodiment, Mag(0) will be asserted high, and all the other control signals will be low, irrespective of the values of bit_request and bit_data. This will select the smallest time delay from the PDD block 44, used to control the width of the low going pulse of pulse_end_n on line 52.

If rst_n is high, pulse_end_n is high, and bit_request signal 22 on line 30 is low, then this indicates that there is no data, and control lines Mag(4), Mag(3), Mag(2), Mag(1) and Mag (0) will be asserted high by logic block 42, and the rest of this magnitude signal will be controlled to be low. This will result in a delay value being programmed in the PDD block 44 equal to delay $\Delta_C$ shown in FIG. 2A. It should be noted that this delay is calculated from the rising edge of the pulsed_data signal 26.

If on the other hand the bit_request signal on line 30 is high, then the values on the control lines will depend on the data bit to be transmitted. If bit_data signal on line 32 is a '0' (low), control lines Mag(2), Mag(1) and Mag(0) will be asserted high and the rest of the control lines will be low. This would control the PDD block 44 to give a delay equal to $\Delta_A$. If the data bit is a '1' (high), then all of the control lines Mag(6) to Mag(0) will be asserted, giving the greatest possible delay. This would control the PDD block 44 to give a delay equal to $\Delta_E$.

In practice, because the delays through components 40, 42 and 46 in FIG. 3 are significant with respect to the individual delay steps of PDD 44, then the actual width of the pulsed_data high pulse will be different from the programmed delay through PDD 44. However, since the delay steps of the programmable delays in the decoder match the delays steps of PDD 44 in the encoder to an acceptable tolerance, then any implementation offset can be compensated at the design stage in either encoder or decoder.

Operation of the encoder circuitry of FIG. 3 will now be described with reference to the timing diagrams in FIG. 2A. As explained above, flip-flop 40 provides the pulsed_data output on line 38. The D input to this D type flip-flop is connected to line 54, which is connected high (logic '1'). Therefore whenever the clock input on line 36 goes high, output Q of the D flip-flop will go high shortly afterwards. However, the reset input of the D type flip-flop 40 is connected to line 52. This reset input is inverted, and therefore whenever the pulse_end_n signal on line 52 goes low, the output of the flip-flop will be reset to 0. The timing of this reset determines the timing of the falling edge of the pulsed_data signal 38.

As shown in FIG. 2A, shortly after the first rising edge of CLK1, the pulsed_data signal goes high. This is because the high input at the D input of flip flop 42 is clocked by CLK1, and output at the Q output of the flip flop. Note that the pulse_end_n signal on line 52 is high, and therefore the D flip flop is not being reset.

The rising edge of the pulsed_data signal will arrive at the PDD block 44, and the time delay provided by this block will be determined by the values of the control signals Mag(6) to Mag(0). These signals are provided by logic block 42, and as the reset signal, rst_n, is high and the pulse_end_n signal is high, but the bit_request signal 30 is currently low, magnitude control lines Mag(4) to Mag (0) will be asserted high, and the other lines will be low. This means that the output of a programmable digital delay block 44 will rise at time C, which is a certain delay after the rising edge of the pulsed_data signal, controlled by the programmable digital delay circuitry.

The rising edge of the delay block output on line 48 will cause the pulse_end_n signal on line 52 to go low, as the signal at the inverted input of AND gate 46 will now be high. The falling edge of the pulse_end_n signal 28 in FIG. 2, on line 52 will in turn cause the flip-flop 40 to reset, causing the pulsed_data signal fall to 0 at time C, very shortly after the delayed rising edge at the PDD output. This is shown in FIG. 2A by arrow 30.

The falling edge of pulsed_data signal on line 38 will also arrive at the input to the programmable digital delay. This time, the control signals provided by logic block 42 will be different. This is because the pulse_end_n signal is now low, and in this situation, as explained above, only Mag(0) is asserted high, and the remaining control signals are asserted low. This provides the minimum delay step through PDD 44. Therefore, following this minimum delay after the falling edge of pulsed_data, the pulse_end_n signal will return to high, releasing the asynchronous inverted clear input to flip-flop 40 again. However, it will not be until the next rising edge of clock signal 36 that the activation of the flip-flop 40 is noticed at the output. Note that a minimum delay is used for the low width of pulse_end_n 52, but if implementation analysis revealed any timing hazard, then this minimum delay could be increased by one or more steps.

On the next rising edge of CLK1, once again the pulsed_data output on line 38 will go high. This rising edge will arrive at the programmable digital delay block 44. This time reset, rst_n, and pulse_end_n are both high, and bit_request is also high. Therefore the control signals 50 will be determined by the bit_data signal on line 32.

As mentioned above, if the data bit were a '0', then control signals Mag(2) to Mag(0) would be asserted, and if the bit_data value were a '1', then control signals Mag(6) to Mag(0) would be asserted. In the case of a '0' bit, the pulse_end_n signal will fall at time A. This would then reset the D flip-flop 40 and cause the pulsed_data output 38 to drop shortly after point A. The falling edge of the pulse_end_n signal on line 52 would cause logic 42 to then assert only control signal Mag(0), providing the minimum delay until the pulse_end_n signal rises again.

Alternatively, if the data bit on line 32 were a '1', then the pulse_end_n signal would fall at time E, causing the D flip-flop 40 to reset and pulsed_data signal 38 to fall. Again, the falling edge of the pulse_end_n signal on line 52 will cause logic 42 to assert only the control signal Mag(0), meaning that the pulse_end_n signal will rise again after the minimum delay step.

PDD 44 is used to control the high width of pulsed_data via bit_request 31 and bit_data 32, and is also used to control the low width of pulse_end_n 52. It is important that this minimum width of pulse_end_n low is controlled in order to avoid asynchronous timing problems which could be induced if pulse_end_n 52 was allowed to merely to glitch low. A minimum delay value is used here, rather than no delay at all, and if implementation analysis reveals any timing hazard, the minimum delay may be increased by one or more steps.

Another subtlety of this design is the property that pulse_end_n input to 42 causes the designated minimum delay code to be set on 50. The design of the PDD 44 is such that all 1's which may be residual in the PDD, as a consequence of a long pulsed_data high pulse width to encode a requested bit_data value of 1, are cleared by the selection of this minimum delay. This means that the next rising clock edge on 36 can occur shortly after the minimum delay following the latest falling edge of pulsed_data. If this were not the case then the next clock edge could not safely occur until after pulsed_data had been low for the maximum delay.

The pulsed_data signal on line 38 will be transmitted via line 12 to module B, where it will be decoded by a decode block 10. Decoding of the pulsed_data signal will now be described with reference to FIGS. 4 and 5.

Figure 5:
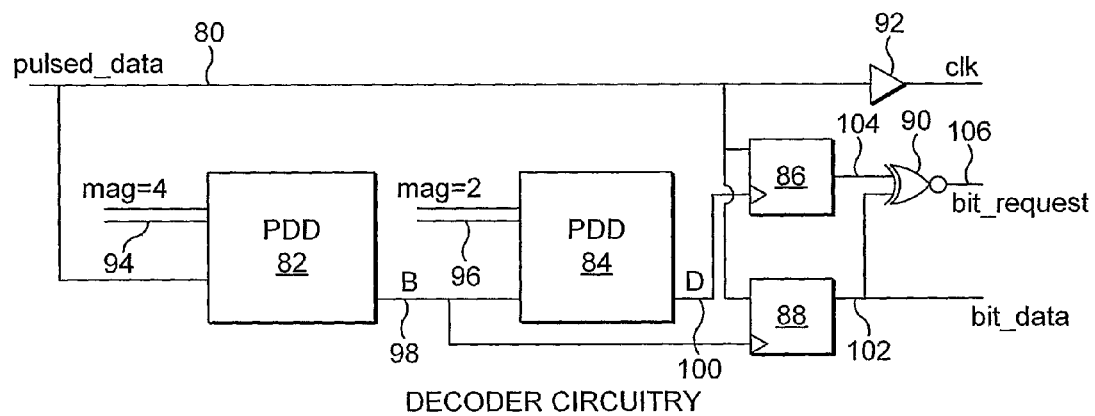
FIG. 5 shows decoding circuitry for decoding data and timing signals from the encoded signal of FIG. 3.

FIG. 5 shows decoder circuitry. Two programmable digital delay blocks are provided labelled 82 and 84. The output of the programmable digital delay block 82 is connected to the clock input of a first D flip-flop 88. The output of the second programmable digital delay block 84 is connected to the clock input of a second D flip-flop 86. The pulsed_data signal is input on line 80 and provided to the input of the PDD block 82. The output of PDD 82 is provided to the input of the PDD 84. Alternative arrangements might implement a single digital delay, which does not need to be programmable, but provides output taps equivalent to magnitudes 4 and 6 respectively.

The output of D flip-flop 88 provides the bit_data signal. The output of the flip-flop 86 on line 104 is connected to one input of a two input exclusive NOR gate 90. The second input of the exclusive NOR gate 90 is connected to the output of flip-flop 88. The output of exclusive NOR gate 90 on line 106 provides the bit_request signal.

The clock is also retrieved from the pulsed_data signal having been passed through a Buffer 92. As described above, the clock is preferably used to clock logic in the destination module. A clock tree would be used to distribute the clock to this logic, and Buffer 92 is provided to drive the clock tree loading. A greater number of buffers may be required for this purpose. It should be noted that there may be a significant delay, possibly more than one period of the clock, in propagating the clock through such a clock tree.

Figure 4:
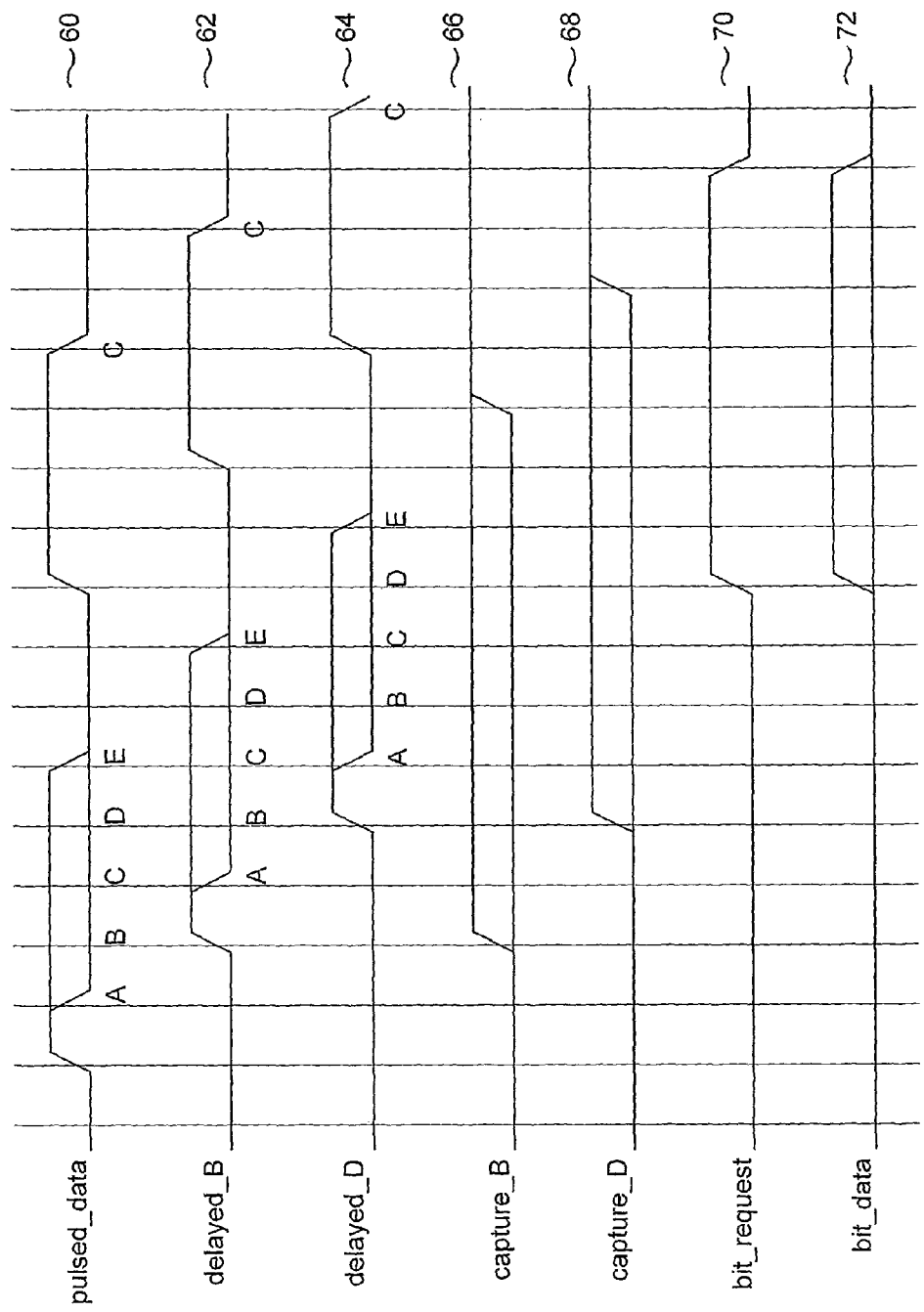
FIG. 4 shows data and timing signals recovered from the encoded signal of FIG. 3.

The programmable digital delay blocks 82 and 84 provide measuring gauges in order to determine the timing of the pulsed_data signal. The output of a first delay block 82 is at time B. Signal 62 shown in FIG. 4 illustrates the signal on line 98 output of PDD block 82. As shown by signal 62, the rising edge of this signal is aligned with position B of the pulsed_data signal. In order to provide this delay, control lines Mag(6) to Mag(0) are used to control delay elements in the PDD blocks 82 and 84 in a similar fashion to the previous example. However, in the PDD 82 and 84, the values on the control lines to each PDD 82 and 84 will usually be fixed so that the delay selection provided by these blocks remains constant.

In order to give a delay at time B, control signals Mag(3) to Mag(0) will be asserted high, and the remaining control signal asserted low. The output of the PDD block 82, delayed to time B, is provided to the PDD block 84. PDD block 84 outputs the pulsed_data signal after a delay to time D. Control signals Mag (1) to Mag (0) are asserted on lines 96 at the input to PDD 84 in order for PDD 84 to have the required delay.

As explained above, the pulsed_data signal, as shown in FIGS. 2 and 4, has three possible positions of the falling edge at times A, C, or E. The pulsed_data signal will arrive on line 80 of the decode block shown in FIG. 5. Consider sampling the pulsed_data at positions B and D respectively. If the values sampled at B and D are both low, then the falling edge must be at position A. If the values sampled at B and D are high and low respectively, then the falling edge must be at position C. If the values sampled at B and D are both high, then the falling edge must be at position E.

According to the encoder, described above, position A represents a valid data bit 0, position C represents no valid data, and position E represents a valid data bit 1. It can be seen that for valid data, sampled values at B and D are either both high, or both low; and if both values at B and D are high or low, the data value can be extracted by looking at either sample. In the embodiment shown in FIG. 5 the sampled value at B is used to extract the data bit. When there is no valid data, then the values sampled at B and D are different, being high and low respectively; hence the data valid signal bit_request can be extracted by the logical exclusive NOR function. Alternatives allow such logic extraction to be automatically optimised and could implement any boolean equivalent. Again, alternatives of the sampling points and boolean logic would allow for alternative numbers of falling edge positions, numbers of bits encoded and alternative coding schemes.

In the preferred arrangement, the sampling mechanism to capture the value at position B is to clock the value of the pulsed_data 80 at the D input of flip-flop 88, using a clock edge at position B. The clock edge is simply created by delaying the pulsed_data 80 by passing it through PDD 82 with appropriate settings on its magnitude inputs 94. The output of flip-flop 88 on line 102 is the value sampled at position B. This signal, is shown in FIG. 4 labelled Capture_B 66. Likewise, the sampling mechanism to capture the value at position D is to clock the value of the pulsed_data 80 at the D input of flip-flop 86, using a clock edge at position D. This clock edge is created by further delaying the delayed_B 98 by passing it through PDD 84 with appropriate settings on its magnitude inputs 96. The output of flip-flop 86 on line 104 is the value sampled at position D. This signal is shown in FIG. 4 labelled capture_D 68. The extracted bit_request 106 is the output of the exclusive-NOR gate 90, with inputs capture_B on line 102 and capture_D on line 104. The capture_B output from flip-flop 88 on line 102 is the extracted bit_data signal, shown as signal 72 in FIG. 4.

As described previously, the programmable delay lines in the encode and decode blocks are preferably programmable digital delay blocks. A programmable digital delay blocks will now be described with reference to FIG. 6.

Figure 6:
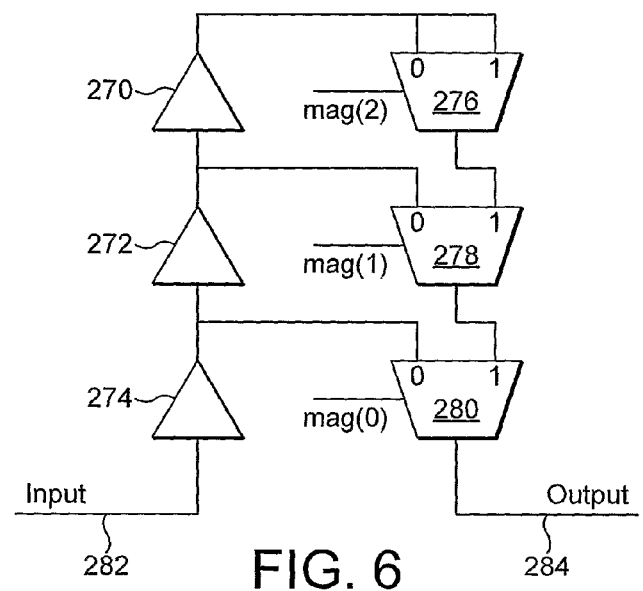
FIG. 6 shows one possible embodiment of a programmable digital delay line.

FIG. 6 shows a programmable digital delay line in which the input to the delay line on line 282 is connected to a number of delay elements 270, 272, 274 which are connected in series. Three multiplexers are provided, which are labelled 276, 278, 280. Each multiplexer has two inputs, labelled '0' and '1'. If the control signal to a multiplexer is a '0', the '0' input will be selected. If the control signal is a '1', the '1' input will be selected.

The '0' input of each of the multiplexers 270 to 274 is connected to a different point on the delay line. For example, the '0' input to multiplexer 280 is connected to the output of delay element 274. In the case of the last multiplexer in the line, which in this case is multiplexer 276, both of its two inputs are connected to the output from the last delay element in the line, delay element 270. The second input to each of the other multiplexers in the circuit is connected to the output of the previous multiplexer. For example, the '1' input to multiplexer 278 is connected to the output of multiplexer 276. The '1' input to multiplexer 280 is connected to the output of multiplexer 278. In this circuit, the output of multiplexer 280 on line 284 provides the output of the delay line.

Operation of this delay line circuit is as follows. Each of the multiplexers 276 to 280 has a control input, and these are labelled Mag(2) to Mag(0) respectively. If multiplexer 280 is controlled to output the signal received at its '0' input, the signal of the output of delay element 274 will be selected for output. In this case the overall delay at the output 284 would be equal to the delay of delay element 274, and the delay added by multiplexer 180. If however, multiplexer 280 is controlled to output the input received at its '1' input, and multiplexer 278 is controlled to output the input received at its '0' input, the signal at the output of delay element 272 will be connected via multiplexers 278 and 280 to the output 284. In this case, the total delay to the input signal present at the output on line 284 would be equal to the delay added by delay elements 274 and 272 and the delays added by the multiplexers 278 and 280. This will always be greater than the delay when only one delay element is selected. Thus in this circuit, monotonicity is always maintained, as the more delay elements that are selected, the greater the delay at the output.

It will be obvious to those skilled in the art that although only three delay elements and three multiplexers have been shown in this circuit for clarity, in practise the number of delay elements and multiplexers could be any required number, for example 500 or more. These would be provided in the series, connected in a similar fashion to delay 272 and multiplexer 278.

The minimum selectable delay in the circuit of FIG. 6 will be when only delay element 274 and multiplexer 280 are selected. If delay element 274 is a very small delay, then this smallest delay can be a lot smaller than smallest delay selected by the multiplexer tree.

Another advantage of the circuit layout in FIG. 6 is that the delay line may be positioned relatively freely on the chip in whatever layout is required by the chip designer. The delay elements and multiplexers could be arranged in one long line, or alternatively they could be arranged in a zig-zag. In either case, the performance of the delay line would not be affected.

Figure 7A:
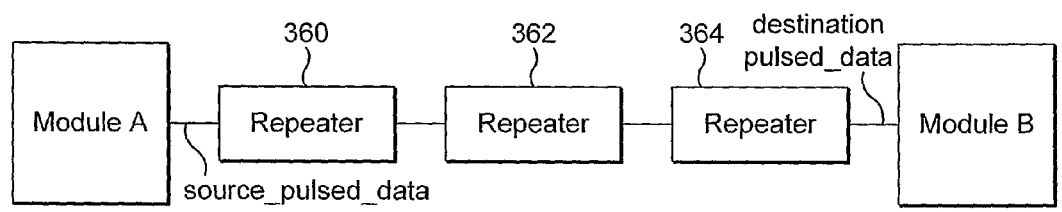
FIG. 7A shows a series of repeaters used for communication between two modules.
Figure 7B:
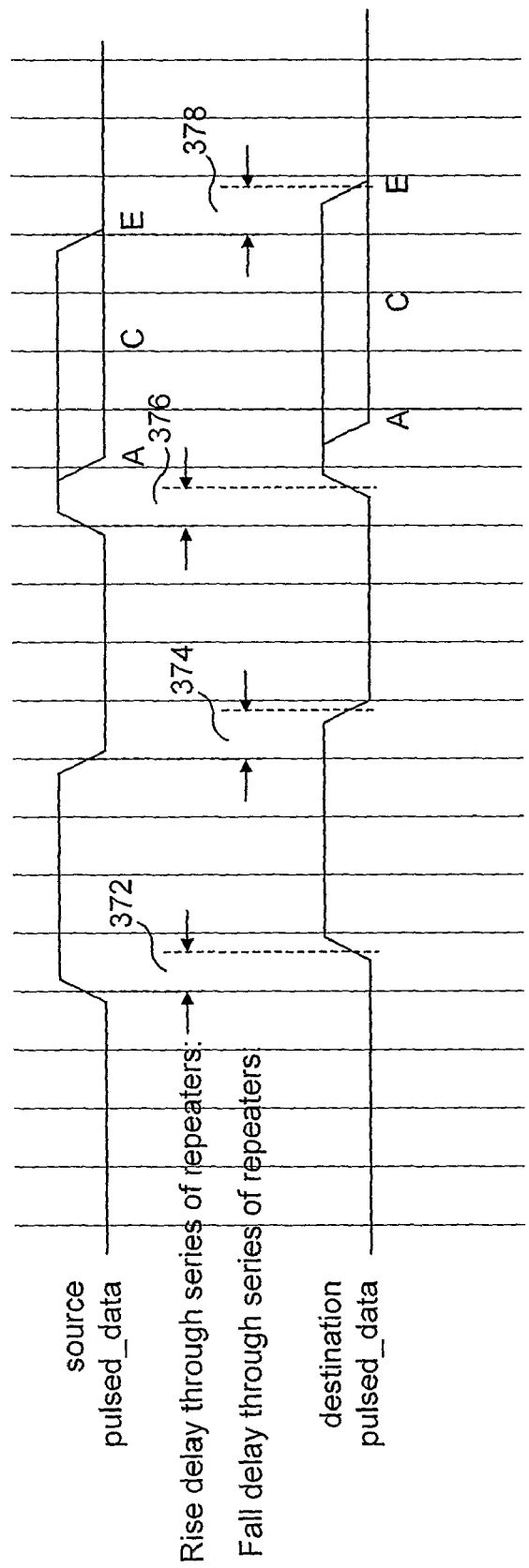
FIG. 7B shows timing of signals in FIG. 6 according to one example.

Reference will now be made to FIGS. 7A and 7B. FIG. 7A shows the use of repeaters between two modules A and B on a chip. As with the circuit of FIG. 1, these modules could alternatively be on separate chips. If the track between modules A and B is relatively long, then high drive strengths will be required in order to overcome capacitance in the line. Lines with high drive strengths risk being cross-talk aggressors, meaning that they interfere with other lines on the chip. The solution is generally to limit the maximum length on any one track.

A problem with limiting track lengths is that the maximum length is small in comparison to the distances between logic blocks on an SoC, or between SoCs. This can be solved by placing "repeaters" along the length of the connection between its endpoints, such that the distance between the repeaters is less than the maximum length. As shown in FIG. 7A in this circuit three such repeaters, labelled 360 to 364, are necessary between modules A and B.

For a parallel bus, significant timing margins need to be provided to allow for the overall delay through the required number of repeaters, and the maximum variation in delays between all paths. The clock frequency is generally reduced to allow for these delays. Alternatively, a clock can be routed alongside the data so that the overall delay is eliminated, however, the variations in delay across the many tracks will still need to be taken into account. Furthermore, in this situation it would also be necessary to resynchronise the data, which impacts performance due to the latency overhead of resynchronising data.

Serial communication links overcome some of the above problems, however there will still be variations in delay between a clock signal and the data line that have to be dealt with.

By implementing a serial connection as described above, using pulsed_data on a Pulsed Serial Link, a number of these problems are overcome, as will now be explained with reference to FIG. 7B FIG. 7B shows examples of a source pulsed_data signal as it leaves module A, and a destination pulsed_data signal that arrives at module B. The rising and falling edges of the pulsed_data signal will be delayed through the three repeaters and the line, but not necessarily by equal amounts. Delays 372 and 376 shown in FIG. 7b are the delays to the rising edges. Delays 374 and 378 shown are the delays to the falling edges.

Importantly, the absolute delay to the pulsed_data signal will not affect the ability to decode the signal, as it is only the timing between the positive edge to the falling edge at A, C or D that contains the data. The absolute delay for a given edge will be affected by the following PVT (process, voltage, temperature) parameters, which, as indicated, will be largely irrelevant when the modules are on the same silicon:

Process (P) variation will be slight because the link and blocks are on the same silicon;
Voltage (V) will be constant across the whole of the chip, apart from locally induced noise effects;
Temperature (T) will be constant because the all of the silicon is at the same temperature.

The main contributor to variations in delay (for a given edge) is locally induced noise effects. These are small compared to PVT variations. Such variations do need to be taken into account in the overall timing analysis of a pulsed serial link. However, it should be noted that the increase in noise margin does not increase linearly with the number of buffers (statistical analysis required).

Therefore there is no limit on the physical distance between communicating blocks, as there is no constraint in the number of repeaters that may be used and the absolute delay that may be added. Furthermore, the clock signal does not have to be limited to meet the timing constraints described above, and therefore the bandwidth is not compromised by the overall distance of the link.

According to embodiments of the pulse data circuitry described above, the difference in delay between opposite polarity edges (the difference between 372 and 374) is largely irrelevant. However, it is important that the delay from each positive edge to the next positive edge is tightly controlled, and also, independently, the delay between each negative edge and the next is tightly controlled.

The design of logic to implement a repeater would be straightforward for one skilled in the art. It does not require a clock (or reset) to be connected to the repeater. The embedded data is not decoded and then reconstituted, so the repeater design is independent of any particular coding scheme. There are no special power supply or other analogue requirements, and repeaters can be instanced by automated tools.

Depending on available chip area for encode and decode blocks, and the required bandwidth, different numbers of selectable pulse widths can be used to encode the data onto the serial connection. For lower bandwidth requirements, then two selectable pulse widths can be used to carry simple binary data. The bandwidth efficiency is essentially one bit of data per clock period, minus any serial protocol overheads. The encoding and decoding of the pulsed serial link with only two selectable pulse widths can be achieved with only a handful of gates.

For higher bandwidths, then a large number of pulse widths can be used. Additional steps need to be taken to ensure that the resolution between successive pulse widths can be both accurately encoded and accurately decoded. This can be achieved with the addition of calibration techniques, as will now be described.

As explained above, when the pulse serial link is used, the absolute delay between the transmitting module and the receive module is not important. This is because the information in the pulse is carried in the timing between the rising edge and the falling edge of the pulse, and not in absolute delay. However, if there are inaccuracies in the programmable digital delay lines of the transmit or receive modules, incorrect data could be determined from the received pulse width. Furthermore, if delay in the line between the modules affects rising edges differently from falling edges, the data may be corrupted. In order to avoid these problems, it is necessary that the receive module is calibrated such that the timing of the cut-off points are adjusted to be correct according to the timing of the received data.

In order to calibrate the pulse serial link, it is necessary to have a calibration circuit in the decode module. According to the present embodiment a number of null pulses are transmitted between the transmit module and the receive module in order to calibrate the decode circuitry with the decode module. For example, every sixteen pulses two null pulses are transmitted. The calibration circuitry will determine which of the possible selectable delays from the programmable digital delay line most closely matches the delay of the null pulse.

Figure 8:
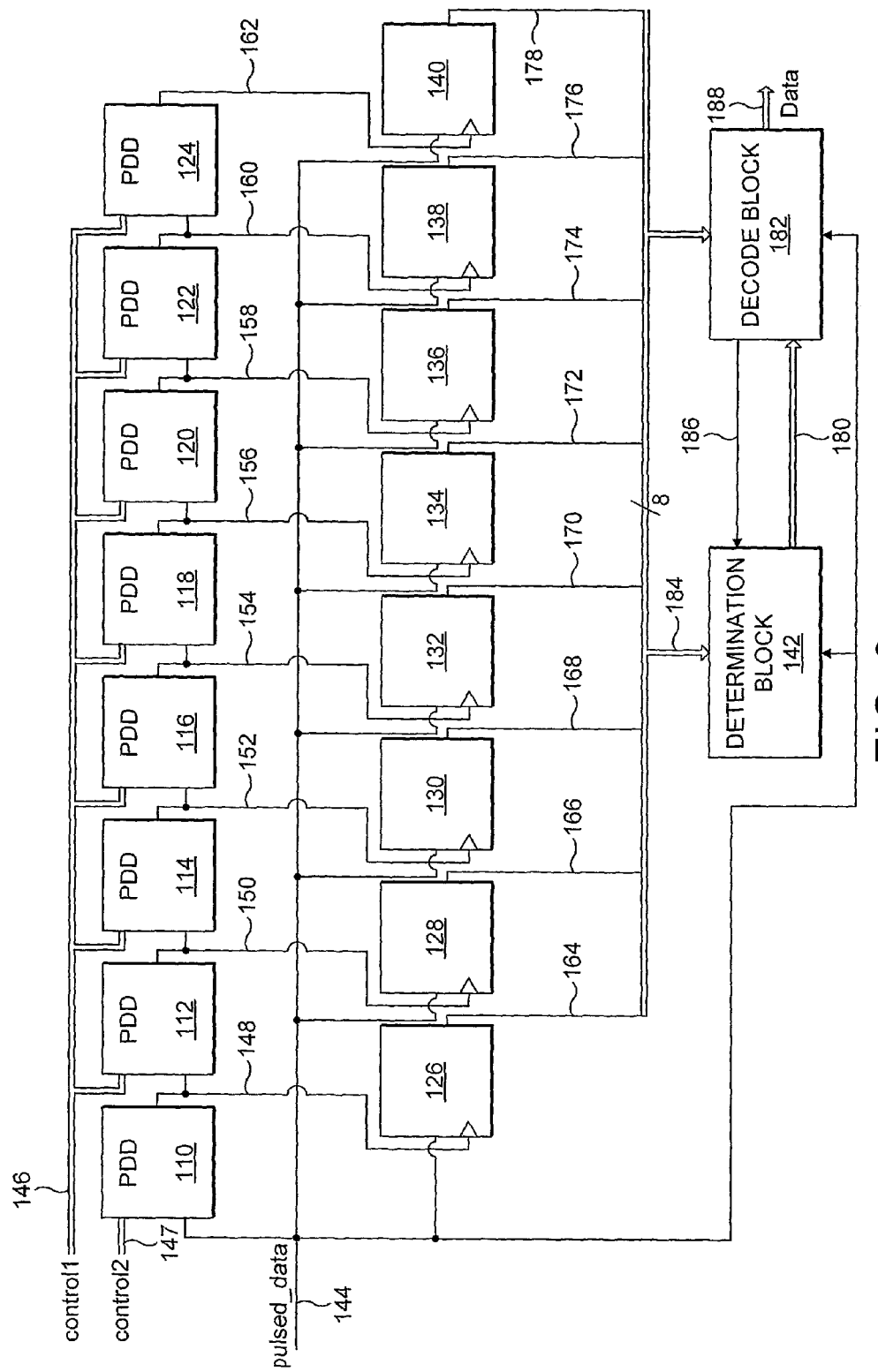
FIG. 8 shows decode and calibration circuitry according to an embodiment of the present invention.

FIG. 8 shows circuitry for determining the timing of a received null pulse, and adjusting the higher and lower cut-off points in the receiver accordingly. This circuit can also be used for determining the timing of narrow and wide pulses, however this will be described later. The circuit of FIG. 8 receives the pulsed_data signal on line 144, transmitted from the transmit module, for example module 4 in FIG. 1. Eight programmable digital delay PDD blocks are provided, labelled 110 to 124. The PDDs are arranged in series, such that the output from one is connected to the input of the next. The input to the first PDD block 110 is connected to the pulsed_data input signal 144.

Each PDD 110 to 124 is a programmable digital delay line as shown in FIG. 6 for example, and receives a magnitude signal to control the delay selected. The number of selectable delays in each PDD, and therefore the number of control lines to each, will depend on the decoder design, however in this example the PDDs have four delay elements, selected by magnitude control inputs Mag(3) to Mag(0). The lines 147 to the first programmable digital delay block 110 are, for example, programmed to select three of the four delay elements, thus control lines Mag(2) to Mag(0) are asserted. The magnitude control signal control1 on lines 146 for the remaining PDD blocks 112 to 124 are, for example, controlled to select just one delay element in each PDD, thus only line Mag(0) is asserted. Thus whilst the first PDD 110 may be controlled separately, the remaining PDDs 112 to 124 are controlled with the same signal.

The output from each PDD block 110 to 124 is connected to the clock input of a respective D type flip-flop 126 to 140. For example, the output of PDD block 110 on line 148 is connected to the clock input of flip-flop 126. The data input to each of the eight flip-flops 126 to 140 is connected to the pulsed_data signal on line 144. Thus the pulsed_data signal is effectively sampled at eight time intervals, the time intervals occurring between three and ten delay element delays after the rising edge of pulsed_data. Although not shown in FIG. 8, the connection of the pulsed_data signal to all of the flip-flops would be performed using an appropriate routing tree and any necessary buffering.

It will be apparent to those skilled in the art that whilst the delays in FIG. 8 have been provided by programmable digital delay blocks 110 to 124, these delays could be provided by individual delay elements, however using programmable delay lines allows increased control of the delays in the delay line as will become apparent from the following description.

The output from each of the flip-flops 126 to 140 on lines 164 to 178 respectively is connected to a determination block 142 and decode block 182. The role of the determination block 142 is to determine any adjustment required to the higher and lower cut-off values which are used to decode the data from the received pulse, as explained above with reference to the decode circuitry in FIG. 5. For this purpose the determination block has a number of control output lines 180 to a decode block 182. Determination block receives a calibration enable signal on line 186 from the decode block, and the pulsed_data signal on line 144 which is used as a clock, but may be buffered prior to this if necessary.

Decode block 182 also receives the pulsed_data signal on line 144. The decode block outputs data on lines 188.

Figure 10A:
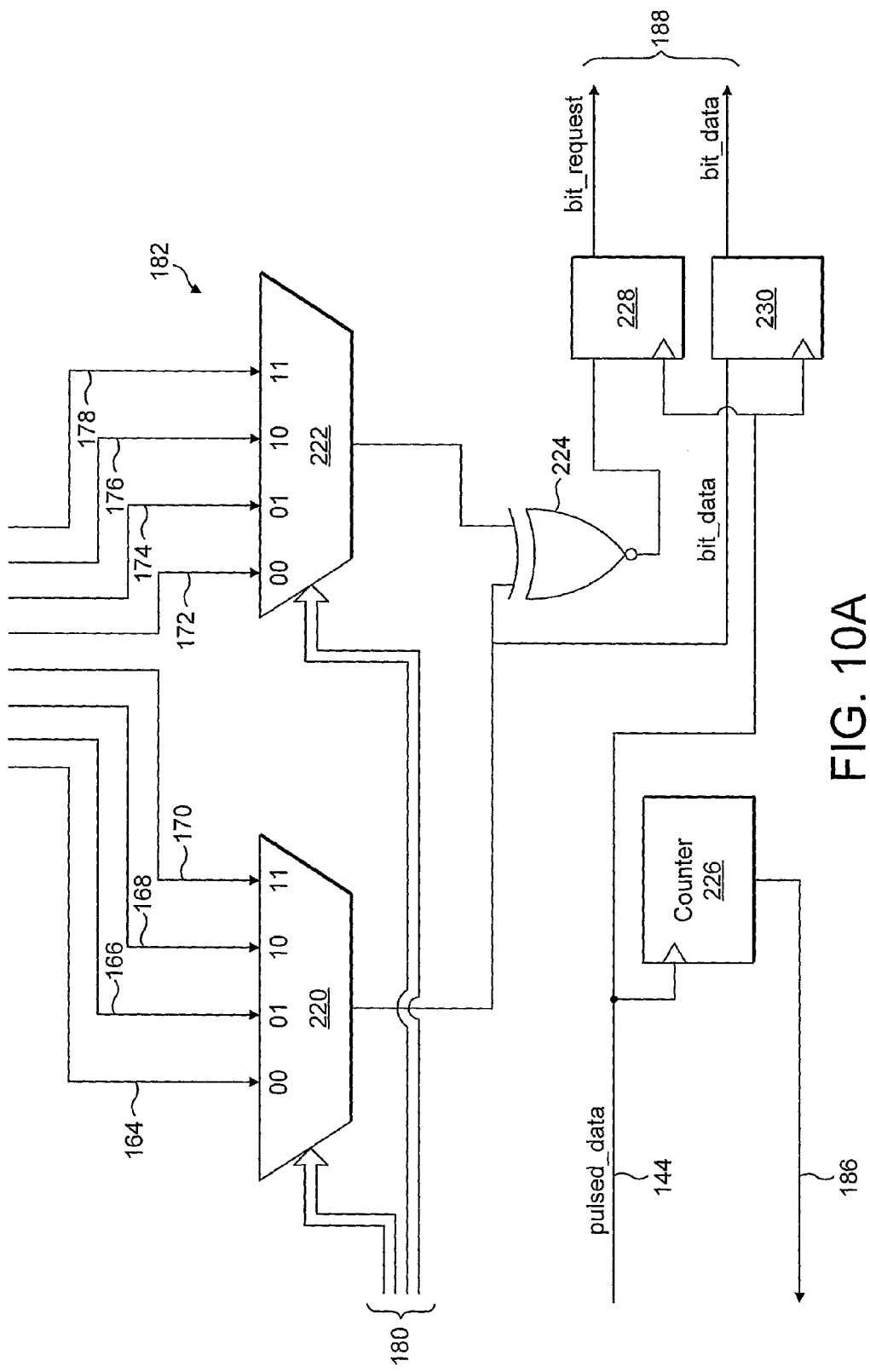
FIG. 10A shows the decode block of FIG. 8 according to one embodiment.
Figure 10B:
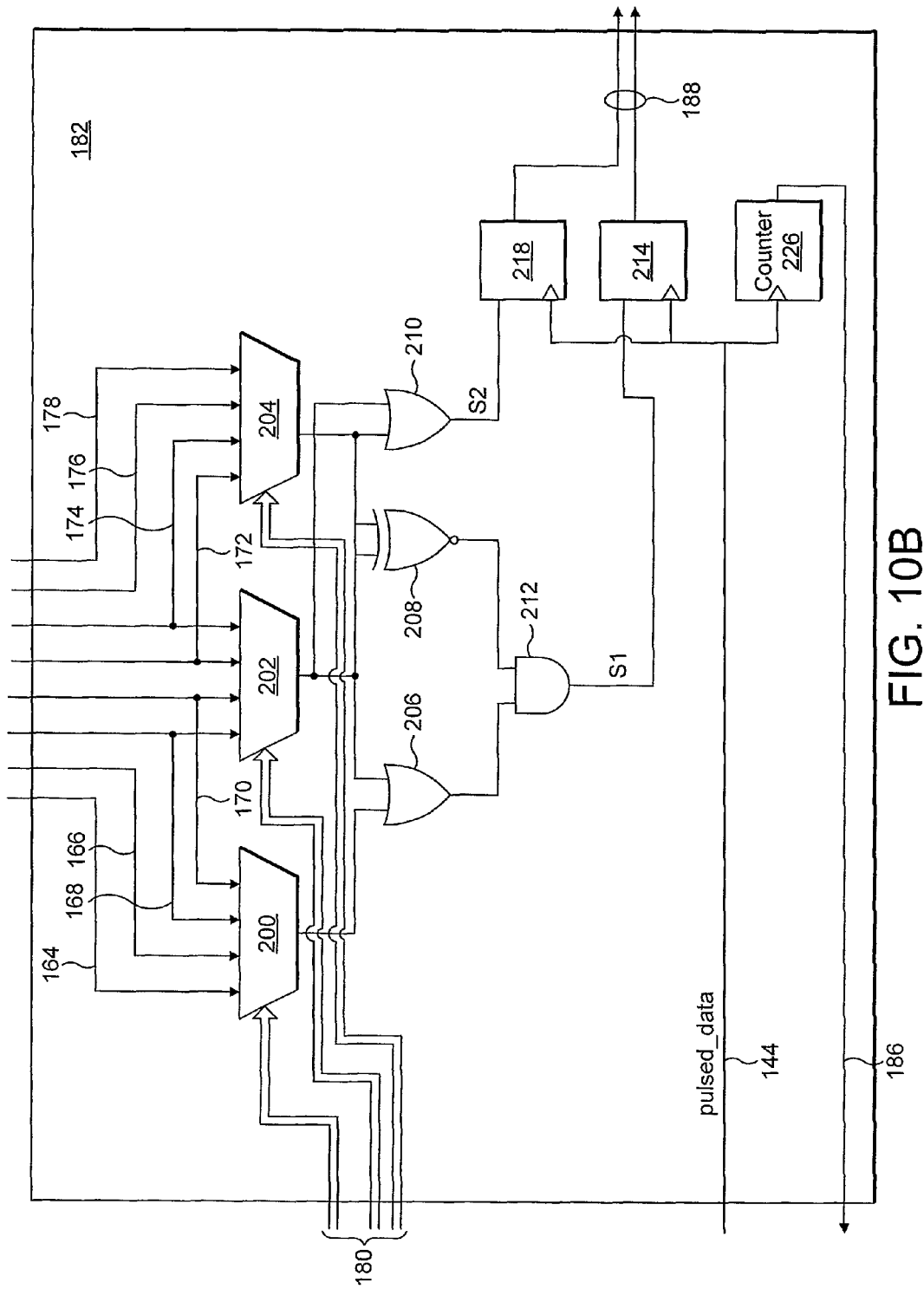
FIG. 10B shows the decode block of FIG. 8 according to another embodiment.

The number of control lines 180 provided to the decode block, and the number of data lines output on lines 188, will depend on the number of pulse widths of the received data. FIG. 10A shows an example of the circuitry in the decode block when there are three pulse widths representing respectively a narrow pulse, a wide pulse and a central null pulse. FIG. 10B shows an alternative example of the decode block 182 in which there are four pulse widths which represent each represent two bit values '00', '01', '10' and '11'.

Referring firstly to FIG. 10A, first and second four-input multiplexers are provided, labelled 220 and 222 respectively. The four inputs of the first multiplexer 220 are respectively connected to the outputs of the first four flip-flops 126 to 132 in FIG. 8 on lines 164 to 170. The four inputs of the second multiplexer 222 are respectively connected to the outputs of the last four flip-flops 134 to 140 in FIG. 8 on lines 172 to 178. Each multiplexer receives a control signal on two control lines for controlling which of its four inputs is output at its output. In this example there are a total of four control lines 180 received from the determination block 142, two to each multiplexer. As shown in FIG. 10A for each multiplexer, control signals '00', '01', '10', and '11' select the first, second, third or fourth inputs respectively.

The output of multiplexer 220 is the decoded data signal 'bit_data' decoded from the pulsed_data signal, however this data is only valid when the bit_request signal is high. The outputs from the first and second multiplexers 220 and 222 connected to the respective first and second inputs of a two input XNOR gate 224. The output from XNOR gate 224 provides the bit_request signal indicating when the bit_data is valid. The bit_data and bit_request signals are input to respective flip-flops 228 and 230 for clocking out, timed by the rising edge of the pulsed data signal on line 144. The bit_data and bit_request signals are then output on lines 188.

The pulse_data signal in the decode circuit 182 is also provided to a counter 226. The output of counter 226 indicates to the determination block 142 whether the received pulse is a normal pulse (data or null), or a predetermined calibration pulse. As explained above, two calibration pulses are preferably transmitted in every 16 pulses, and therefore this counter block comprises a 4-bit counter with the counter block output on line 186 being determined by an 'AND' operation on the three most significant bits of the count value. Counter block 226 thus counts pulses as they arrive, and asserts a signal on line 186 when the calibration pulses are received. A similar counter in the encode block is also provided such that calibration pulses are transmitted at these times.

It will be obvious to those skilled in the art that although a simple counter, 226, has been used to illustrate the principle involved in distinguishing between normal transmission of information and transmission of calibration pulses, in practice such distinction would be readily made available from higher levels in the protocol stack of any serial protocol used for transmission of data along the pulsed serial link.

Figure 11:
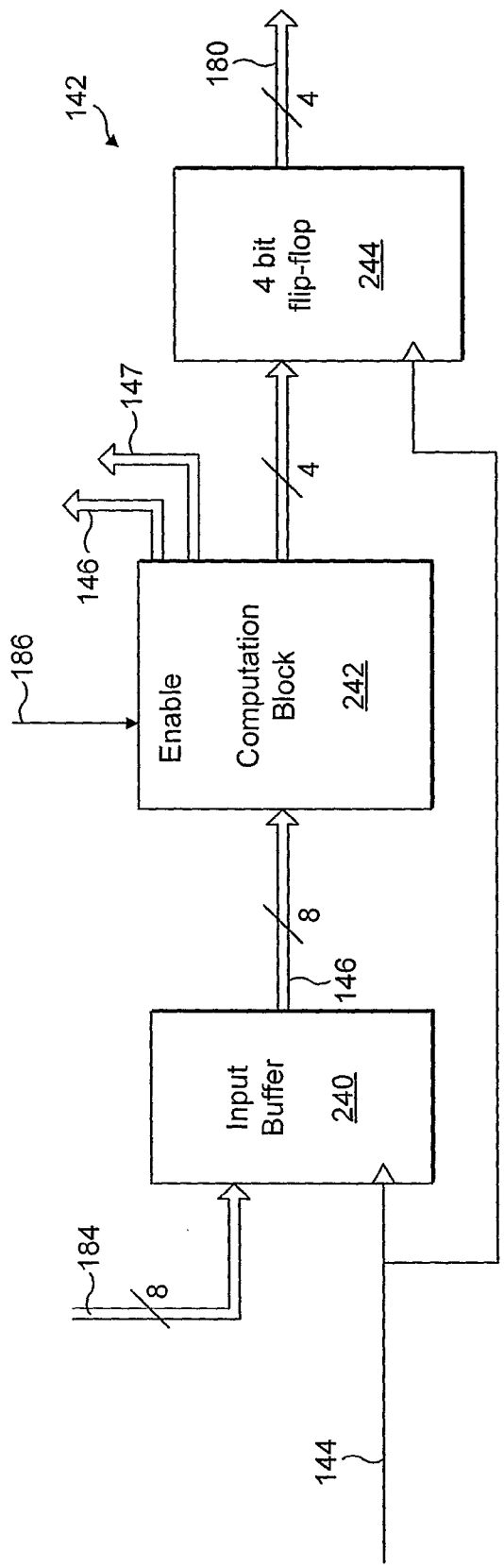
FIG. 11 shows the determination block of FIG. 8 according to one embodiment of the present invention.

The determination block 142 is shown in more detail in FIG. 11. As shown, this block comprises an input buffer 240 which receives the outputs from the eight D-flip-flops 126 to 140 shown in FIG. 8 and clocks them out on lines 146 to a computation block 242. Computation Block 242 is enabled by the signal on line 186 from counter block 226 of the decode block 182. When enabled, computation block 242 determines which of the outputs on lines 164 to 178 should be used as the higher and lower cut-off points for decoding the pulsed_data signal, based on the location of the null pulse as determined by the lines 184. The selection of cut-off points will be controlled by the two multiplexers 220 and 222 in FIG. 10A, and therefore a 2-bit input is required to each of these multiplexers in order to select the line to be connected to the output. These 4-bits are determined by the computation block 242 and output to a 4-bit flip-flop 244, which is clock by the rising edge of pulsed_data on line 144. Flip-flop 244 stores the 4-bit control value, and outputs this same signal on line 180 to the decode block 182 on every rising edge of the pulsed_data signal until four new bits of data are outputted from the computation block to the flip-flop.

Computation block 242 also outputs control signals on lines 146 and 147 to the PDDs of FIG. 8. This function of the computation block 242 will be described in more detail below, and is used when the null pulse is too far off centre, or if the range of decode circuitry needs correcting. The outputs 146 and 147 are preferably latched in the same way as the four bits on lines 180, such that these signals remain constant unless altered by the computation block, however flip-flops for performing this have not been shown in FIG. 11.

Operation of the calibration circuitry and decode circuitry of FIGS. 8, 10A and 11 will now be described with reference to FIGS. 9a and 9b.

Figure 9A:
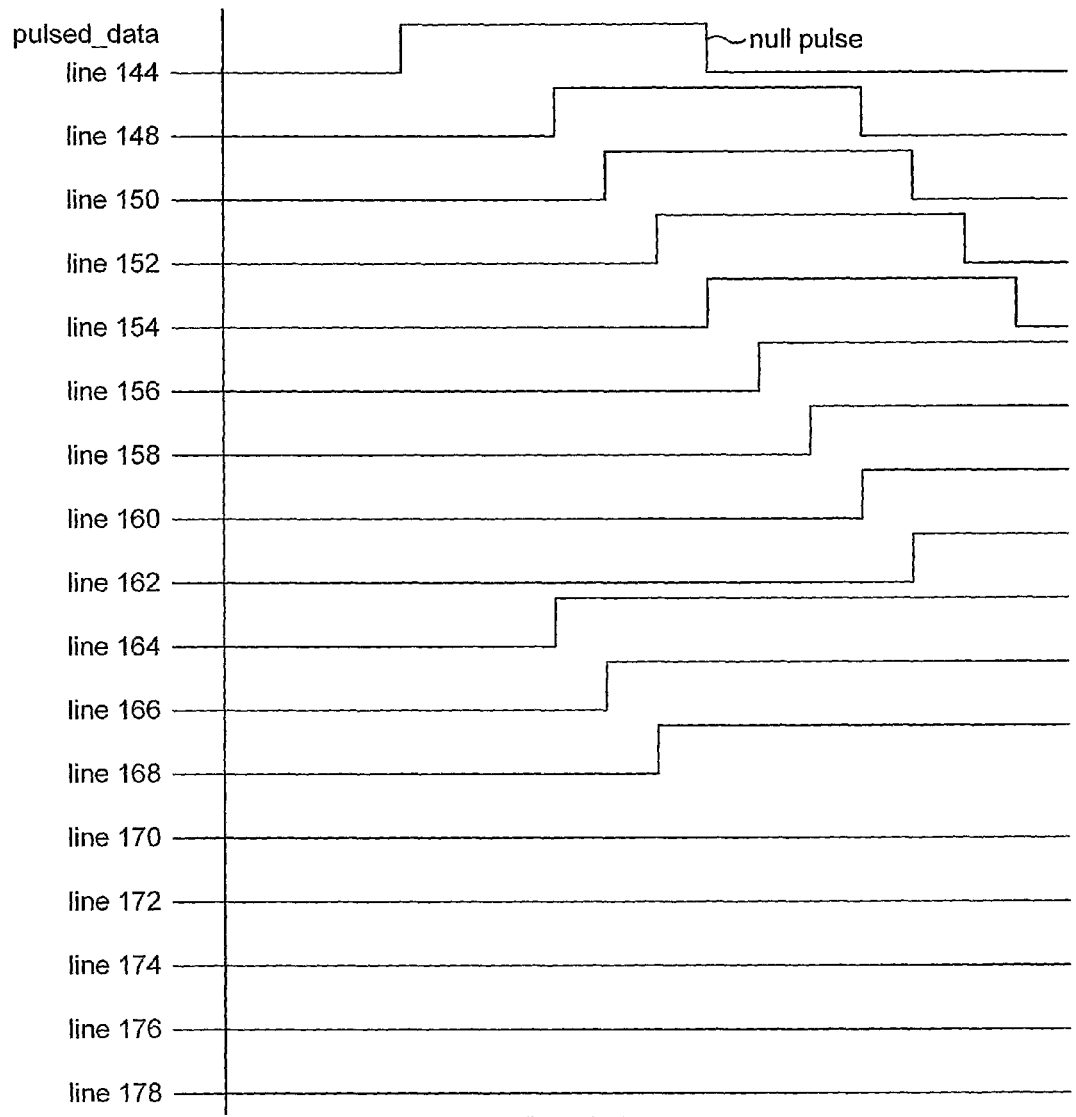
FIG. 9A shows data and timing signals recovered from the circuitry of FIG. 8.

FIG. 9a shows the timing of signals in the circuit of FIG. 8. The first timing signal shown in FIG. 9a is the pulsed_data signal on line 144. In this example, the null pulse has a rising edge and a falling edge at the timing as shown. The pulsed_data signal will be delayed by the PDD blocks in the circuit of FIG. 8. The output from these blocks on lines 148 to 162 are next shown in FIG. 9a. As shown, the timing of the rising edge on lines 148 to 162 will occur later and later further along the line of PDDs, going from line 148 to line 162. These rising edges provide the clocking edges for the flip-flops 126 to 140. The output of flip-flops 126 to 140 on lines 164 to 178 are also shown in FIG. 9*a*. These signals are the result of clocking the pulse data signal on line 144 at the time determined by the respective clock signals on lines 148 to 162.

As shown, the signals on lines 164 to 168 will go high when clocked. However, the signal on line 170, which is clocked by line 154, remains low as the clock occurs after the falling edge of the pulse on line 144. The remaining lines 172 to 178 also remain low. This indicates that the falling edge of the pulsed data signal occurs between the rising edges of the signals on lines 152 and 154.

Figure 9B:
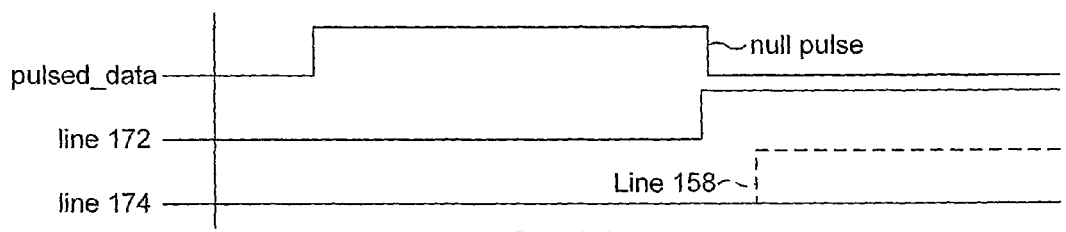
FIG. 9B shows data and timing signals recovered from the circuitry of FIG. 8 according to another example.

FIG. 9*b* shows a alternative example in which the null pulse is now between the timing of the outputs of PDDs 118 and 120 in the decoder. In this case, the result from the sample circuit is that line 172 goes high before the falling edge of the null pulse, however line 174 remains low. The dashed line shows the clock on line 158 at the output of PDD 120.

As explained above, when calibration pulses are received this is indicated to the determination block 142 by the signal on line 186, which enables the computation block 242. Computation block 242 determines, based on the signals on lines 164 to 178, the best timing of the lower and higher cut-off points. Table 1 below provides an example of how this can be achieved.

have timing 4, 5 and 3 respectively. As shown in column 2, if the null is at timing '4', in this example the lower cut-off is determined to be at '2', and the higher cut-off is determined to be at '6'. This would be determined by computation block 242 in the determination block 142, and the multiplexers 220 and 222 would be controlled to selected lines 166 and 174 respectively. In a similar fashion, if the null is determined to be at timing '5', computation block 242 will output control signals on lines 180 such that lines 168 and 176 are selected by multiplexers 220 and 222 respectively. In the examples of columns 2 to 4 it is determined that the cut-off points are two delay values above and below the determined timing of the null point, and computation block 242 includes a look-up table or a number of logic gates in order to generate the control signals to the multiplexers.

In column 5 of Table 1, an example is shown in which the timing of the null pulse is so off-centre (delay timing '2') that the narrow pulse arrives earlier than the range of timings detectable by the circuit of FIG. 8. In this case the control signal 147 to the first PDD 110 can be controlled by the computation block 242 to select a smaller delay, such that the timing of the outputs of all PDD 110 to 124 is made earlier. For example, rather that three delay elements being selected in PDD 110, only one delay element can by selected by

TABLE 1

| Delay timing | Centre = 4 | Centre = 5 | Centre = 3 | Centre = 2 |
|---|---|---|---|---|
| 0 |  |  | Narrow Pulse | Lower cut-off |
| 1 | Narrow Pulse |  | Lower cut-off |  |
| 2 | Lower cut-off | Narrow Pulse |  | Null pulse |
| 3 |  | Lower cut-off | Null pulse |  |
| 4 | Null pulse |  |  | Higher cut-off |
| 5 |  | Null pulse | Higher cut-off | Wide Pulse |
| 6 | Higher cut-off |  | Wide Pulse |  |
| 7 | Wide Pulse | Higher cut-off |  |  |
| 8 |  | Wide Pulse |  |  |

Referring to Table 1, the first column shows the nine possible determined timings of the falling edge of the received pulse, as determined by circuitry of FIG. 8. When clocked, if all of the signals on lines 164 to 178 are low, the falling edge of the null pulse is at delay timing '0', which indicates that it is between the rising edge of the pulsed_data signal and the rising edge of the output of PDD 110. Delay timings '1' through to '7' indicate that the falling edge of the null pulse is between the timings of the output signals of two of the PDDs 112 to 124, and therefore a respective number of the lines 164 to 176 are high. For example, if lines 164 and 166 are high, this is delay timing '2'. If all of the outputs 164 to 178 are high, this indicates that the null timing is after the timing of the rising edge at the output of the last PDD 124, and this is delay timing '8'.

The default cut-off points in the decoder are determined to be based on the null point having a delay timing of '4', and are therefore at timings '2' and '6' respectively. This default value is chosen such that the assumed pulse width of a null pulse is equal to the programmed null pulse width in the encoder. However, if delays created by the programmable delay line in the encode module are not matched to the delays in the programmable delay lines in the decode module, or delays in the delay line affect the pulse width, the timing of the null pulse received at the receiver may not be equal to timing position '4' as expected.

Columns 2 to 4 of Table 1 show the suggested timing of the higher and lower cut-off points if the null is determined to asserting only Mag(0). Because two null calibration values are preferably transmitted, this adjustment can be made in response to the first pulse, and the second null pulse can be used to select the correct cut-off points based on the new timing of the circuitry.

It will be obvious to those skilled in the art that although ideally a clean logic value is captured in each of the flip-flops 126 through 140, in practice one of these flip-flops may enter a metastable condition. Consider flip-flop 134. If the rising edge of 156 occurs close to the falling edge 144, thus violating the setup and hold parameters of flip-flop 134, then the output of this flop-flop on 172 may remain unchanged, may change cleanly or may change at some indeterminate time later. This condition is known as metastability. Typically, such metastability issues are solved by adding synchronizer flip-flops (not shown in FIG. 8) at suitable positions.

Figure 2B:
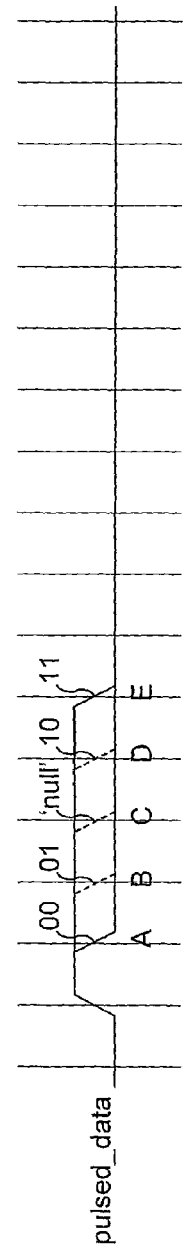
FIG. 2B shows the pulsed_data signal in another example of a pulsed serial link according to another embodiment.

Reference will now be made to FIG. 10B which shows an example of the decoder block 182 in which the received pulse has four possible pulse widths, each representing two binary values, as show in FIG. 2B but without a null pulse. A null pulse is not necessary if the encoder and decoder are in agreement as to when data will be transmitted, for example for the first fourteen pulses in every sixteen pulse cycle. The decode circuitry is slightly more complex when there are four widths, as there needs to be a cut-off point in each of the spaces between widths in order to distinguish between each pulse width. Thus FIG. 10B comprises first, second and third multiplexers, labelled 200, 202 and 204 respectively, which can be used to select appropriate lower, middle and upper cut-off points. These multiplexers each receive four of the flip-flop outputs shown in FIG. 8, such that there can be some flexibility regarding the timing of the cut-offs. In this example the first multiplexer receives lines 164 to 170, the second multiplexer receives lines 168 to 174, and the third multiplexer receives lines 172 to 178. As with the circuit of 10A, the multiplexers are controlled by control signals from the determination block 142, however there are now three 2-bit control signals, 2-bits to control each multiplexer.

The outputs from the first, second and third multiplexers 200, 202 and 204 are provided to a number of logic gates in order to decode the data. The outputs of first and second multiplexer are connected to the two inputs of an OR gate 206. The outputs of the second and third multiplexers are connected to the two inputs of an exclusive NOR gate 208, and the outputs from exclusive NOR 208 and OR 206 are input to a two-input AND gate 212. The output from AND 212 provides the first data output bit, S1 of the decoded signal. The outputs of the second and third multiplexers are connected to the two inputs of an OR gate 210, the output of which provides the second data output bit S2 of the decode block. The data signals S1 and S2 are passed through flip-flops 214 and 218 respectively prior to output of the decode block on lines 188. Flip-flops 214 and 218 are clocked by the pulsed_data signal on line 144.

As with the circuit of FIG. 10A, the decoder of FIG. 10B comprises a counter 226, the operation of which is the same as that of FIG. 10A and will not be described again here.

The determination circuitry when used with the circuit of FIG. 10B operates slightly differently to the operation described above in relation to three pulse widths. Rather than a null pulse being transmitted by the transmit module to calibrate the decode circuitry, one of either the second or third data pulse (B or D in FIG. 2B) is preferably transmitted, the determination circuitry being configured according to which calibration width is transmitted. Referring back to FIG. 11, the computation block 242 will now use the width of the calibration pulse determined from the signals on lines 184 to generate the 6-bit control signal to multiplexers 200 to 204 of FIG. 10B. The output of computation block to flip-flop 244 is therefore 6-bits, and the 4-bit flip-flop is replaced with a 6-bit flip-flop to output the 6-bits on lines 180 to the decode block.

Table 2 below shows an example of the determined timing of the calibration pulse, in this example the second data pulse, and the cut-off points determined by the computation block 242 in response.

TABLE 2

| Delay timing | Second Data Pulse = 3 |
|---|---|
| 0 | |
| 1 | (First data pulse) |
| 2 | Lower cut-off point |
| 3 | Second data pulse |
| 4 | Middle cut-off point |
| 5 | (Third data pulse) |
| 6 | Higher cut-off point |
| 7 | (Fourth data pulse) |
| 8 | |

Whilst the circuitry described above provides a linear offset to calibrate the received pulse widths to the PDDs in the decode block, in some cases the range of widths may require adjustment. For example, if each of the delay elements in the PDD of the encode block provides a greater delay than those in the decode block, the difference in width between a narrow pulse and a wide pulse may be incorrect in the decoder even if the width of the null pulse is correctly calibrated. In the example of Table 2, even if the second data pulse is correctly positioned, the first and fourth data pulses could be out range of the PDD line, below the timing delay '0', and above the delay '8'. This could lead to errors in decoding pulses. In another example the range of pulses transmitted by the encode block could be much smaller that the decode block is configured to receive, and therefore all of these pulses are determined to be null pulses.

In order to detect when this type of adjustment is required, it is necessary to perform calibration using not only a null pulse or one data pulse (central, or near central in the range of possible pulse widths) but also using pulses having pulse widths at the upper and lower limits.

Table 3 below shows examples of the timing of received pulses in relation to the decoder settings for the data pulse with narrow, wide and null widths. As shown in this table, the null pulse is correctly positioned. The narrow and wide pulses are received at delay timings '3' and '7' respectively (second column), however the decoder settings are not configured to these values. As shown in the third column of the table, the lower and higher cut-off points are positioned at delays '3' and '7' respectively, the same timing as the received narrow and wide pulses, and therefore it is possible that these pulses will not be detected as data pulses, but as null pulses. Despite the null pulse being correctly positioned, it is necessary to calibrate the higher and lower cut-off points. The cut-off points would preferably be at delay timings '4' and '6'.

TABLE 3

| Delay | Received | Decoder settings |
|---|---|---|
| 0 | | |
| 1 | | |
| 2 | | Expected Narrow Pulse |
| 3 | Narrow Pulse | Lower cut-off |
| 4 | | |
| 5 | Null pulse | Null pulse |
| 6 | | |
| 7 | Wide Pulse | Higher cut-off |
| 8 | | Expected Wide Pulse |

In order to calibrate the higher and lower cut-off values in the decoder to the correct range, it is necessary for narrow and wide calibration pulses to be transmitted. For example, rather than transmitting a pair of null pulses for calibration every 16 pulses, every other pair of calibration pulses comprises one narrow pulse followed by one wide pulse. The determination block 142 of FIG. 8 is used the determined positions of the narrow and wide pulses to adjust the range of the higher and lower cut-off points. Referring to FIG. 11, computation block 242 will store the result of the first calibration pulse (narrow pulse), and will only determine cut-off points and the multiplexer control signal once the second calibration (wide pulse) has been received.

It is necessary for the calibration circuit to know whether the received pulse is a narrow pulse, wide pulse, or null pulse. Counter 226 in FIG. 10A is adapted to be used for this purpose, such that as well as the output that indicates when the pulse is a calibration pulse, a second output is provided to the computation block 242 indicating whether the pulse is a null or data pulse, and a third output will indicate which width the pulse is, for example a narrow pulse or a wide pulse. In this way computation block 242 knows which pulses have been received, and can perform calibration accordingly.

Once calibration block 242 has determined the narrow and wide pulse widths, the range of the cut-off points can be selected in dependence on this as described above in relation to the calibration using the null pulse, except that now the cut-off points are chosen to be one delay more than the width of the narrow pulse, and one delay less than the width of the wide pulse.

Figure 12:
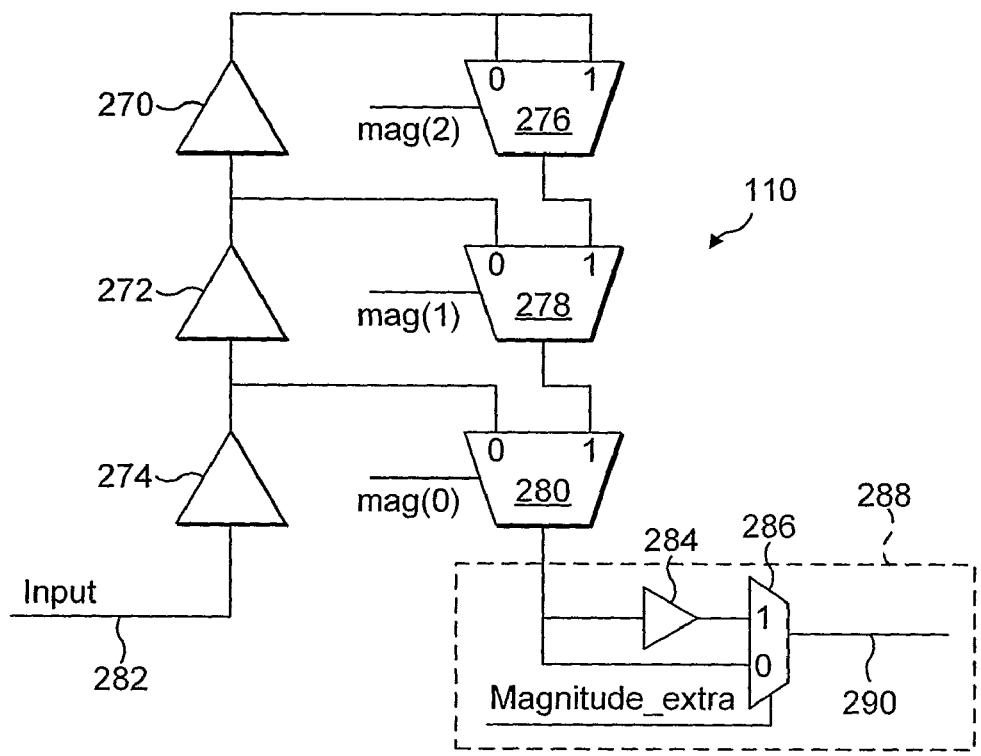
FIG. 12 shows the programmable digital delay line of FIG. 6 with additional fine tune circuitry.

It is possible that the range of selectable delays using PDDs 110 to 124 in FIG. 8 is not sufficient for the range between the narrow and wide pulses. The range is then adjusted by changing control signals control1 and control2, on lines 146 and 147 to the PDDs. However, changing control1 on line 146 to select an extra delay element in each PDD is likely to be too great an increase in range, resulting in a much larger step size between the outputs of the PDDs. FIG. 12 shows an example of PDD circuitry that allows a fine tuning of the range in the delay series.

In some embodiments, the decoder is able to self-calibrate without the need for dedicated calibration pulses. Instead, on-going calibration can be performed based on the timing information gained from edges received during the normal reception of data. The following table, table 4, shows an example of a scheme used for calibration based on information pulses.

TABLE 4

| Delay | Action by decoder |
|---|---|
| 1 | (calibration required) |
| 2 | Invoke adjustment for delta-A |
| 3 | Permitted margin for delta-A |
| 4 | Nominal delta-A |
| 5 | Permitted margin for delta-A |
| 6 | Invoke adjustment for delta-A |
| 7 | (calibration required) |
| 8 | (calibration required) |
| 9 | (calibration required) |
| 10 | Invoke adjustment for delta-C |
| 11 | Permitted margin for delta-C |
| 12 | Nominal delta-C |
| 13 | Permitted margin for delta-C |
| 14 | Invoke adjustment for delta-C |
| 15 | (calibration required) |

In the example of Table 4, there are two possible pulse widths for data, pulse width delta-A and pulse width delta-C. The pulse width of delta-A is programmed to have a pulse width of 4, whereas pulse width delta-C is programmed with a pulse width of 12. A tolerance in the system allows the pulse width of pulse delta-A to have a delay of 3 or 5 without any calibration being performed by the decoder. Likewise, for the pulse width delta-C, delays of 11 or 13 are permitted without calibration, This is important as it avoids calibration being necessary on every pulse received.

During reception of data, if the pulse width falls outside the permitted ranges, calibration is required. For example, if the pulse falls at delay 2 or 6, it will be presumed that this pulse represents a pulse width delta-A, and an adjustment of the decode circuitry for delta-A will be performed. If the pulse was at delay 2, then the adjustment would be to calibrate the decode circuitry such that delay 3 is considered to be the mid-point of the delta-A pulse. In this way, another pulse at delay 2 will be within the systems permitted range. If the delay is 6, then the system will be calibrated such that programmed delay 5 is the mid-point. Likewise, if the received pulse has a delay of 10 or 14, it will be assumed to represent pulse width delta-C, and similar adjustment will be performed for the expected value of this pulse. In this way, if the pulse width of a data pulse starts to drift out of adjustment, it is corrected before the error is so great that a wrong data value is received.

In the unlikely event that a pulse occurs with a width of 1, 7, 8, 9, or 15, the error will be deemed to be so far out that the result can not be relied upon, and therefore calibration using dedicated calibration pulses will be necessary to recalibrate the system. In some systems with sufficient tolerance, this would never be necessary. Obviously the numbers of permitted delays, delays that require adjustment, and delays that require calibration given in Table 4 are by way of example only, and alternative numbers or arrangements of these delays could be used.

It will be obvious to those skilled in the art that the system of Table 4 can be implemented using circuitry similar to that shown in FIGS. 8, 10 and 11, with a few modifications. For example, fifteen PDDs will be required to give the full range of detectable delays, 1 to 15. Likewise, fifteen flip-flops will be required to clock the outputs of these PDDs. The determination block 142 would receive the fifteen sampled outputs, and based on the detected pulse width as described above, the control signals would be generated to control the multiplexers of FIG. 10A.

According to previously described embodiments, the signal on line 186 is used to enable the computation block of FIG. 11 when a calibration pulse is being received. When normal data pulses are to be used for calibration, calibration takes place irrespective of the enable signal on line 186. Such a system can be used alone without using dedicated calibration pulses at all, in which case line 186, and the counter 226 for generating this signal are not required. However, calibration using dedicated calibration pulses and on-going calibration using data pulses are preferably combined in one system such that upon start-up and at certain times during operation calibration pulses are transmitted, indicated by the enable signal, and at all other times on-going calibration is performed using the data pulses as described above.

Referring to FIG. 12, programmable digital delay line 110 is shown, however, all PDDs 110 to 124 preferably comprise a similar circuit. This circuit is identical to the PDD circuit of FIG. 6, except that it further comprises fine tune circuitry 288. This fine tune circuitry allows a finer adjustment to be added to the delay from the delay line. Fine tune circuitry 288 comprises a multiplexer 286 with two inputs, the first connected to the output of multiplexer 280 of the delay line via a delay buffer 284, and the second being connected to the output of multiplexer 280 directly. The output of multiplexer 286 on line 290 comprises the new output of the delay line. Multiplexer 286 is control by a signal magnitude_extra at its control input.

The fine tune delay circuitry decreases the step size between selectable time delays in the PDD. Buffer 284 preferably provides a delay value of half the delay of any one of the buffers 270 to 274 plus associated multiplexer 276 to 280. Therefore, if the delay from the delay line increments in steps of 75 ps, the delay of buffer 284 is preferably be 37 ps, such that the step size is reduced to this value. The delay introduced will depend in part on the drive strength of the buffer, and this will be described in more detail herein below. Depending on the control signal magnitude_extra, the output from buffer 284, or the output of multiplexer 280 directly, will be selected for output from multiplexer 286 on line 290. This will then be the output of the delay circuitry.

Figure 13:
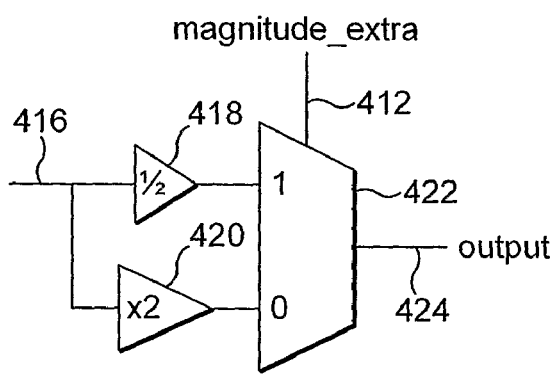
FIGS. 13 to 15 show alternative embodiments of the fine tune circuitry of FIG. 12.
Figure 14:
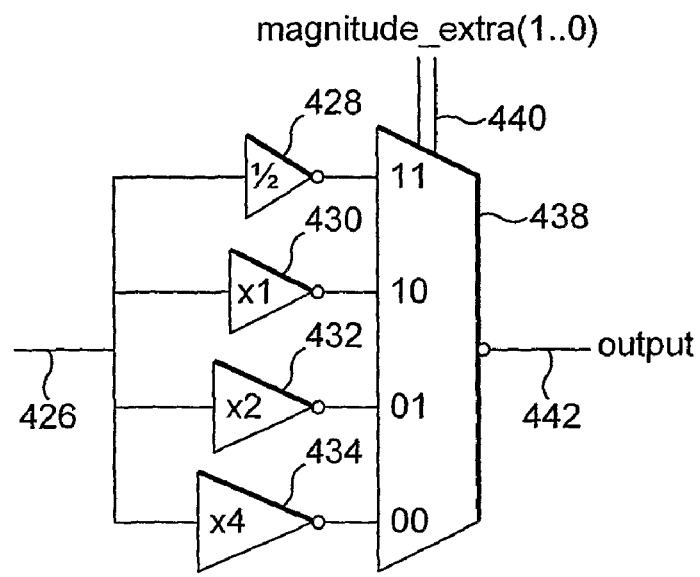
Figure 15:
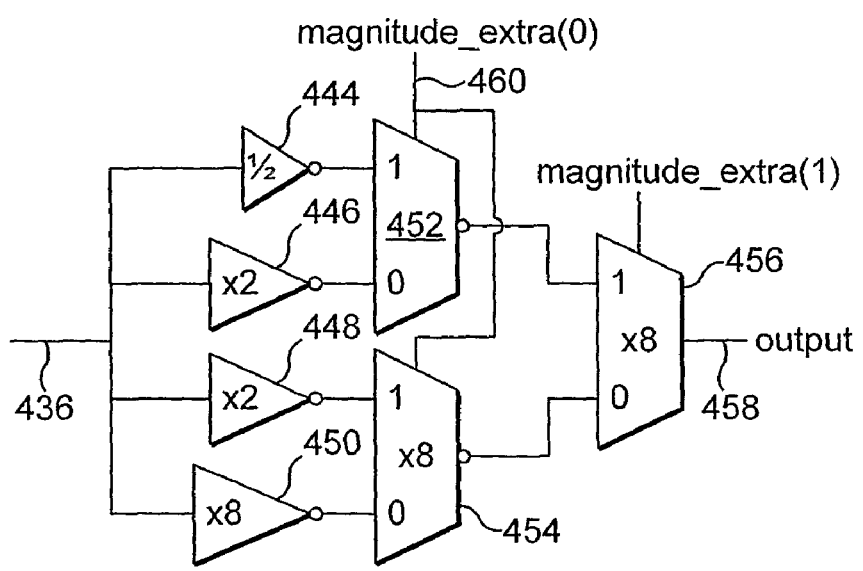

The fine tuning is possible in FIG. 12 due to the difference in delay between the path with buffer 284 connected to the '1' input of multiplexer 286, and the path with no delay connected to the '0' input of multiplexer 286. This difference may be added to any of the selectable delays from the delay line. The fine tune delay in FIG. 12 has the disadvantage, however, that even the delay introduced by the smallest buffer may be too large for the required step size. For example, a small buffer may give a delay of 40 ps, and the minimum steps size requirement may be 25 ps. FIGS. 13 to 15 show alternative circuitry in which all the input paths to the multiplexer include a delay buffer, and the difference between the delays of these delay buffers are used to fine tune the delay at the output of the delay circuitry. In this way smaller step sizes may be achieved. Any of these circuits could be used connected in to replace circuitry 288 in FIG. 12, with their input connected to the output of multiplexer 280.

FIG. 13 shows a circuit comprising a multiplexer 422, with two inputs, one connected to the output of a buffer 418 and one connected to the output of a buffer 420. The respective drive strengths of buffers 418 and 420 are a half, and 2, and therefore the delay introduced by buffer 420 will be smaller than that introduced by buffer 418. Typically, in any digital cell library, there are a variety of drive strengths available for each cell type of a given logic functionality. Drive strength may be characterised by the maximum capacitive loading that each cell is designed to drive and this may be normalised relative to the drive strength of some nominal cell. So, for example, a 2× cell has a maximum load of twice the capacitance of the nominal cell, and ½× cell has a maximum load of half the capacitance of the nominal cell. An interesting property of such a range of cells occurs when such cells are presented with (nearly) the same capacitive loading, as in the case of FIGS. 13 to 15. In this case the smaller, weaker ½× cell 418 takes longer to drive its output than the larger, stronger 2× cell 420. The difference in delay does not equate to the half to twice as much as the nominal cell, but there is a difference which scales almost linearly as the drive capacity doubles.

The operation of the circuit in FIG. 13 is the same as circuitry 288 in FIG. 12, except that the smallest step size between selectable time delays is now the difference in delay between buffer 418 and buffer 420. For example, if the path with buffer 418 is initially selected, then the delay can be decremented by selecting the path with buffer 420 instead, without changing the delay selected in the delay line. If buffer 418 provides a 75 ps delay, and buffer 420 a 50 ps delay, the difference between the path with buffer 418 and 420 would be a delay of 25 ps, giving a small step size. After this, the next selectable delay would be if the next delay is selected from the delay line, and the path with buffer 418 is again selected by multiplexer 22. If the delay increments from the delay line are 50 ps, the circuit of FIG. 13 will reduce the step size between each selectable delay to 25 ps.

In the above example the delay caused by multiplexer 422 has been ignored, however any difference between the '0' input path of this multiplexer and the '1' input path may increase or decrease the step size. If the smallest step size is required, the path with buffer 420 is preferably connected to the quickest input of the multiplexer, so that the difference between the two delay paths is reduced.

It should be noted that the step size resulting from a change from a selection of buffer 418 to buffer 420, and the step size resulting from a change from a selection of buffer 420, to the selection of buffer 418 and the next delay in the delay line, are preferably identical such that delay increments are relatively uniform, but in some cases this may not be the case. It should also be noted that although in examples the selected delay is decremented, the same selections can be performed in reverse if the delay is to be incremented.

The circuit of FIG. 13 only allows one extra step between the selectable values of the programmable delay line. Furthermore, as the buffer in FIG. 13 is non-inverting buffers, the minimum delay through this buffer is greater than if an inverting buffer were used. FIGS. 14 and 15 show alternative circuits for reducing the step size between selectable time periods in which there are three extra steps between the selectable delays from the PDL, and in which inverting buffers are used. The circuit in FIG. 14 comprises a multiplexer 438 with four inputs, each of the four inputs connected to the output of a respective inverting buffer 428 to 434. Inverting buffer 428 has a drive strength of a half, inverting buffer 430 has a drive strength of ×1, inverting buffer 432 has a drive strength of ×2, and inverting buffer 434 has a drive strength of ×4. The delay introduced by each of these buffers is therefore different depending on the drive strength of the buffer. Buffer 434 with a size of ×4 will have the shortest delay. For example, buffer 428 may provide a 100 ps delay, buffer 430 a 80 ps delay, buffer 432 an 65 ps delay, and buffer 434 a 50 ps delay. Ignoring differences in the delay paths introduced by buffer 438, the step size may now be as low as 15 ps, with a maximum of 20 ps steps size.

The output of multiplexer 438 is also inverted such that the overall polarity of this circuit is the same at the input and output, that is to say the circuitry does not to invert the signal. Using inverting buffers in this circuit, as well as the inverted output of multiplexer 438, means that delays in each path can be slightly reduced, providing lower minimum delay output from the circuit and a general smaller implementation.

As multiplexer 438 has four possible inputs that may be selected for output, two control lines are provided for controlling the multiplexer on lines 440, labelled magnitude_extra 1 and 0. These control lines are required to select one of the four inputs which may be selected by asserting the two magnitude_extra control signals respectively logic 11, 10, 01 and 00.

Operation of the circuit in FIG. 14 is similar to the previous circuits, except that a larger range of fine tune delays may now be selected.

The circuit in FIG. 15 shows an alternative arrangement of the circuitry in FIG. 14, but using three two-input multiplexers rather than the four input multiplexer. The three multiplexers are labelled 452, 454 and 456. Each of these multiplexers has two signal inputs and one signal output, as well as a control input. The output from multiplexers 452 and 454 is inverted, and supplied to the two inputs of multiplexer 456. The inputs of multiplexer 452 are connected to the output of inverting buffer 444 and inverting buffer 446 respectively. In this arrangement, not only can the drive strengths of the cells 444, 446, 448 and 450 be varied, but also the drive strengths of the multiplexers 452 and 454, in order to effect the most even distribution of delay differences through the four paths.

The '1' and '0' inputs to multiplexers 452 and 454 are respectively connected to buffers 444 to 450, with respective drive strengths of a half, two, two and eight. Note that in this circuit there are two buffers of the same drive strength, though the delay through the path is also affected by the choice of input to each multiplexer (one input is typically faster than the other), the drive strength of the multiplexer, and the difference in load presented by the input to the 1× multiplexer 452 versus the input to the 8× multiplexer 454.

Operation of the circuit in FIG. 15 will be the same as for FIG. 14, except that when control signal magnitude_extra (1 . . . 0) is asserted 01 a smaller delay is selected that when the signal is 10.

Referring again now to FIG. 11, as explained above the computation block 242 includes output lines 146 and 147 for controlling the PDDs 110 to 126 in FIG. 8. Included in these outputs in the magnitude_extra signal, comprising one or two bits depending on the fine tune circuitry used in the PDDs, such that the range can be increased by a relatively small amount.

It will be apparent that if the narrow or wide pulses or both are detected to be out of range, computation block 242 will have no way of knowing how much calibration is required, and therefore this must be done with trial and error. It may require more than two calibration pulses before the range is correctly determined. However, the range is only likely to require large correction upon start-up of the system. Therefore, preferably a larger number of calibration pulses, for example eight pulses, are transmitted directly after start-up of the link in order to calibrate the decoder, and thereafter one or two calibration pulses transmitted every sixteen pulses is likely to be sufficient in order to provide dynamic continuous refinement.

Whilst the calibration and decode circuitry described above is described using examples of a pulsed signal with three or four selectable pulse widths, the same principles are applicable to any number of selectable pulse widths, however a larger percentage of calibration pulses may be required for a much larger number of selectable pulse widths. Also, it will be obvious to those skilled in the art that the number of PDDs in series in the circuit of FIG. 8 could be reduced or increased, and the number of selectable delay elements and fine tune delays in each PDD can be chosen to best suit the particular parameters of the link.

The number of calibration pulses transmitted per group of data pulses could be greater or fewer than the two pulses in every sixteen pulses described in the above example. The ratio of calibration pulses to data pulses will depend on the number of selectable pulse widths, and also parameters of the serial link, such as its sensitivity to changes in temperature.

The application hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A circuit for decoding data from a pulsed signal received on a single line, the circuit comprising:
   receiving means for receiving a first edge of the pulsed signal and a second edge of the pulsed signal on the single line, the first and second edges being separated by a time period, the time period representing said data;
   decode circuitry comprising:
      determining means arranged to determine a value of the time period, and
      decoding means arranged to decode said data based on said determined value of the time period;
   a memory arranged to store a reference value;
   calibration means for calibrating said decode circuitry based on a comparison between said determined value of the time period and said reference value, wherein the determining means comprises a plurality of sampling units for sampling said pulsed signal at different times; and
   selection means for selecting the output of one of said plurality of sampling units to be decoded.

2. The circuit as claimed in claim 1, wherein said data comprises one of a first digital value represented by a first time period and a second digital value represented by a second time period.

3. The circuit as claimed in claim 1, further comprising a plurality of delay lines for controlling the sampling time of respective sampling units.

4. The circuit as claimed in claim 3, wherein said plurality of delay lines are connected in series.

5. The circuit as claimed in claim 3, wherein said calibration means comprises means for controlling at least one of said plurality of delay lines.

6. The circuit as claimed in claim 3, wherein at least one of said plurality of delay lines comprises fine tune circuitry.

7. The circuit as claimed in claim 1, wherein said reference value is the expected value of said time period.

8. The circuit as claimed in claim 1, wherein said pulsed signal is a calibration pulse wherein the time period of said calibration pulse represents a predetermined digital value known to said calibration circuitry.

9. The circuit as claimed in claim 1, wherein said reference value is the value associated with said one sampling unit of the plurality of sampling units to be decoded.

10. The circuit as claimed in claim 1, wherein said means for calibrating decode circuitry comprises means for controlling the selection by said selection means in said decode circuitry.

11. The circuit as claimed in claim 1, wherein counter circuitry is arranged to receive said pulsed signal and provide an indication to said calibration circuitry when said pulsed signal comprises a calibration pulse.

12. The circuit according to claim 1, wherein the determination means includes a computation block arranged to determine which of the outputs of the sampling units are to be used as higher and lower cut-off points for decoding said data.

13. The circuit according to claim 12, wherein said computation block is arranged to generate a multi-bit control value identifying said outputs for controlling the selection means.

14. The circuit according to claim 1, wherein the pulsed signal conveys clock information on each first edge.

15. The circuit according to claim 14, wherein said clock information is used to clock said selection means.

16. The circuit according to claim 14, wherein said clock information is used to clock said determination means.

17. A method for decoding data from a pulsed signal received on a single line, the method comprising the steps of:
   receiving a first edge of the pulsed signal and a second edge of the pulsed signal on the single line, the first and second edges being separated by a time period, the time period representing said data;
   determining a value of the time period;
   calibrating decode circuitry based on a comparison between said determined value of the time period and a reference value stored in a memory; and
   decoding said data based on said determined value of the time period, wherein said step of determining the time period comprises the step of sampling said pulsed signal at different times, and said step of decoding said data comprises the step of selecting one of said sampled pulsed signals to be decoded.

18. The method as claimed in claim 17, wherein said data comprises one of a first digital value represented by a first time period and a second digital value represented by a second time period.

19. The method as claimed in claim 17, wherein said reference value is the expected value of said time period.

20. The method as claimed in claim 17, wherein said pulsed signal is a calibration pulse wherein the time period of said pulse represents a predetermined digital value.

21. The method as claimed in claim 17, wherein said step of calibrating said decode circuitry comprises the step of controlling the selecting step by selection means in said decode circuitry.

22. The method as claimed in claim 21, wherein said reference value is the value associated with said one of said sampling units selected to be decoded.

23. The method as claimed in claim 17, wherein a plurality of delay lines are provided for controlling the sampling time of respective sampling units.

24. The method as claimed in claim 23, wherein said step of calibrating said decode circuitry comprises the step of controlling the delay of at least one of said delay lines.

25. The method as claimed in claim 17, wherein said step of calibrating said decode circuitry is performed based on the determined time period of a pulsed signal carrying data.

26. The method as claimed in claim 17, wherein said step of calibrating said decode circuitry is performed based on the determined time period of a calibration pulse.

27. A method according to claim 17, wherein a computation block is arranged to determine which of the sampled pulse signals are to be used as higher and lower cut-off points for decoding said data.

28. A method according to claim 27, wherein the computation block is arranged to generate a multi-bit control value identifying said selected pulse signals.

29. A method according to claim 17, wherein the pulsed signal conveys clock information on each first edge.

30. A method according to claim 29, wherein said clock information is used to clock selection means for controlling said selecting step.

31. A circuit according to claim 29, wherein said clock information is used to clock said determination means for controlling said determining step.

32. A system for encoding and decoding data using a pulsed signal received on a single line, the system comprising:
a first module comprising encoding circuitry for:
generating the pulsed signal comprising a clock signal and data by encoding the data into the pulsed signal as a time period between a first edge of the pulsed signal and a second edge of the pulsed signal; and
transmitting the pulsed signal on the single line to decoding circuitry;
a second module comprising the decoding circuitry for:
receiving the first edge of the pulsed signal and the second edge of the pulsed signal on the single line;
determining a value of the time period; and
decoding the data based on the determined value of the time period;
memory for storing a reference value; and
calibration circuitry for calibrating the decoding circuitry based on a comparison between the determined value of the time period and the reference value.

33. The system of claim 32, wherein:
the first edge comprises a rising edge and the second edge comprises a falling edge.

34. The system of claim 32, wherein:
the pulsed signal further comprises a data valid signal encoded into the pulsed signal.

35. The system of claim 32, wherein:
the clock signal is encoded into the first edge of the pulsed data signal.

36. The system of claim 32, wherein:
the pulsed data signal is used as a clock signal for circuitry of the system clocked by the first edge of the pulsed data signal.

37. The system of claim 32, wherein:
the pulsed data signal is used to generate a clock for the second module.

38. Circuitry for generating a pulsed signal transferred on a single line, the circuitry comprising:
encoder circuitry for:
encoding data and a data valid signal into a pulsed clock signal, wherein:
when the data valid signal indicates that the data is available, the data is encoded into the pulsed clock signal as a first time period between a first edge of the pulsed clock signal to be used as a clock signal by a decoder and a second edge of the pulsed clock signal, and
when the data valid signal indicates that the data is not available, the data valid signal is encoded into the pulsed clock signal as a second time period between the first edge of the pulsed clock signal and the second edge of the pulsed clock signal; and
transmitting the pulsed signal on the single line to at least one component outside the circuitry.

39. The circuitry of claim 38, wherein:
the first edge comprises a rising edge and the second edge comprises a falling edge.

40. The circuitry of claim 39, the encoder circuitry comprising:
logic circuitry connected to a programmable digital delay component and providing a plurality of control lines to the programmable digital delay component, a number of asserted control lines from the plurality of control lines determining a value of the time period.

41. The circuitry of claim 39, wherein:
the pulsed clock signal comprises a calibration pulse, and the time period of the calibration pulse represents a predetermined digital value.

* * * * *